(12) United States Patent
Nada

(10) Patent No.: US 6,493,618 B2
(45) Date of Patent: Dec. 10, 2002

(54) VEHICLE CONTROL USING MULTIPLE SENSORS

(75) Inventor: Mitsuhiro Nada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/790,617

(22) Filed: Feb. 23, 2001

(65) Prior Publication Data
US 2001/0029414 A1 Oct. 11, 2001

(30) Foreign Application Priority Data
Mar. 15, 2000 (JP) .................. 2000-072125
Apr. 6, 2000 (JP) .................. 2000-104336

(51) Int. Cl.[7] .................................. G06F 19/00
(52) U.S. Cl. .................. 701/34; 701/29; 701/63; 701/79; 701/70
(58) Field of Search .................. 701/29, 34, 63, 701/79, 70, 110; 123/198 D, 399; 73/118.1

(56) References Cited

U.S. PATENT DOCUMENTS

| 5,804,934 A | 9/1998 | Yamada et al. |
| 6,116,214 A * | 9/2000 | Ishida .................. 123/399 |
| 6,131,680 A | 10/2000 | Nii et al. |

FOREIGN PATENT DOCUMENTS

| JP | 9-158765 | 6/1997 |
| JP | 9-191501 | 7/1997 |
| JP | 10-77889 | 3/1998 |

* cited by examiner

Primary Examiner—Gertrude Arthur
(74) Attorney, Agent, or Firm—Oliff & Berridge, PLC

(57) ABSTRACT

One of the two accelerator sensors 165a and 165b is detected faulty by analyzing variation patterns outputted by the two sensors even when the outputs of two sensors remain within their respective normal output ranges. An accelerator control input is determined using the output of the fault-free sensor if a faulty sensor is detected. The fault detector detects the faulty sensor by analyzing variation patterns of outputs of the first and second accelerator sensors when the outputs of the first and second accelerator sensors remain within respective normal output ranges thereof.

51 Claims, 20 Drawing Sheets

INPUT/OUTPUT CHARACTERISTICS OF ACCELERATOR SENSOR

EXAMPLE OF CHANGE IN ACCELERATOR POSITION SIGNAL DURING NORMAL OPERATION

FAULT EVENT NO. 1 (Line Breakage) IN ACCELERATOR SENSOR

FAULT EVENT NO. 2 (Hold) IN ACCELERATOR SENSOR

Fig.11(A)

FAULT HISTORY AREA IN INITIALIZED EEPROM

| TRIP NO. | FAULT EVENT NO. 1 (Line Breakage) | FAULT EVENT NO. 2 (Hold) | FAULT EVENT NO. 3 (Square Waveform Oscillation) | FAULT EVENT NO. 4 (Irregular Oscillation) | FAULT EVENT NO. 5 (Differential Fault) |
|---|---|---|---|---|---|
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| ... | ... | ... | ... | ... | ... |

POINTER PT ▲

Fig.11(B)

FAULT HISTORY AREA IN EEPROM FOLLOWING FAULT OCCURRENCE

| TRIP NO. | FAULT EVENT NO. 1 (Line Breakage) | FAULT EVENT NO. 2 (Hold) | FAULT EVENT NO. 3 (Square Waveform Oscillation) | FAULT EVENT NO. 4 (Irregular Oscillation) | FAULT EVENT NO. 5 (Differential Fault) |
|---|---|---|---|---|---|
| 1 | 0 | 0 | 0 | 0 | 0 |
| 2 | 0 | 0 | 0 | 0 | 1 |
| 3 | 0 | 1 | 0 | 0 | 0 |
| 4 | 0 | 0 | 0 | 0 | 0 |
| ... | ... | ... | ... | ... | ... |

POINTER PT ▲

EXAMPLE OF VARIATIONS IN ACCELERATOR OPENING WHEN ACCELERATOR SENSOR HAS DEVELOPED A FAULT

MAP OF TORQUE COMMAND VALUE AND VEHICLE SPEED DEPENDING ON ACCELERATOR OPENING AOP

CHANGE RATE OF ACCELERATOR OPENING DEPENDING ON VEHICLE SPEED

EXAMPLE OF CHANGES IN VEHICLE SPEED AND ACCELERATOR OPENING

TARGET ACCELERATION $\alpha_t$ DEPENDING ON VEHICLE SPEED

OFFSET VALUE FF OF ACCELERATOR OPENING APPLIED WHEN CURRENT ACCELERATION $\alpha_c$ AND TARGET ACCELERATION $\alpha_t$ HAVE OPPOSITE SIGNS

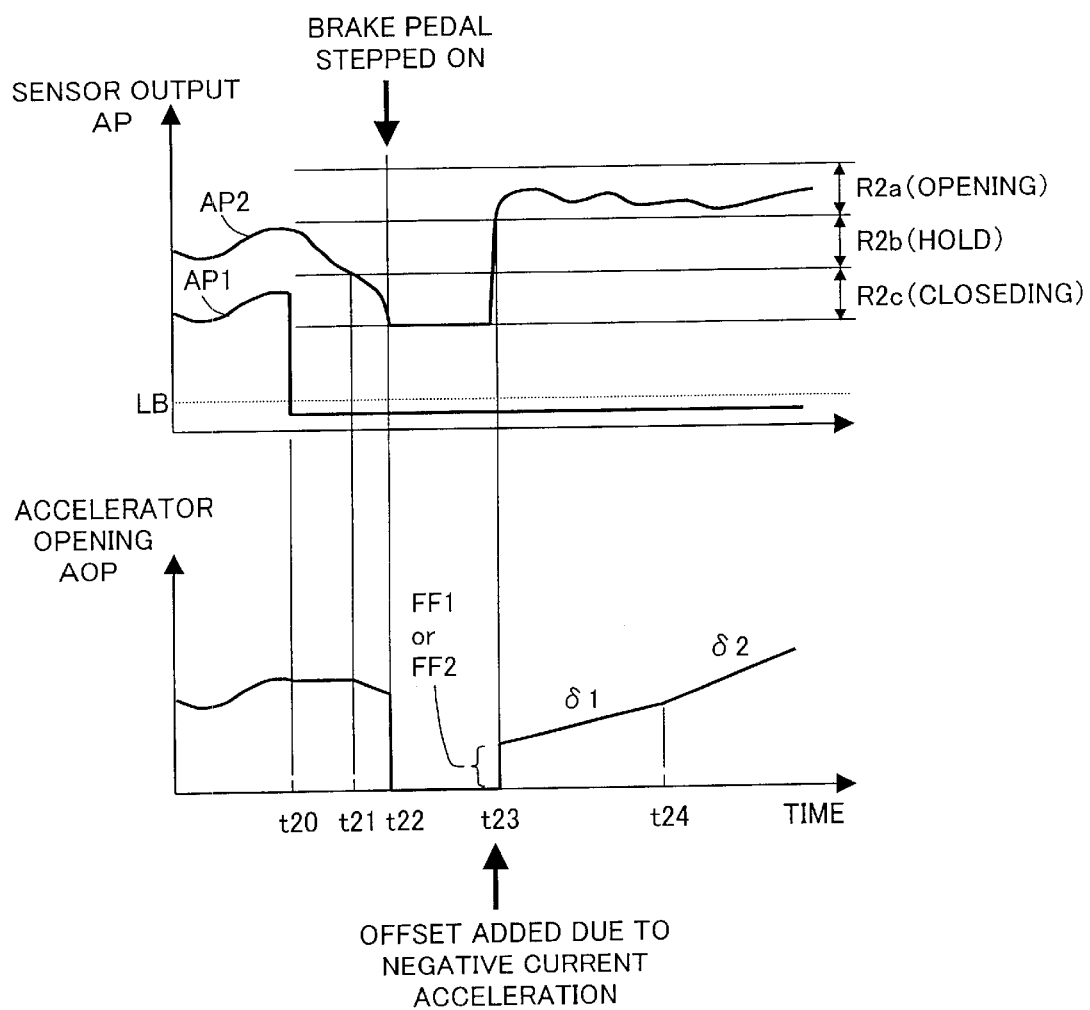

TARGET ACCELERATION $\alpha_t$ AND MINIMUM ACCELERATION $\alpha_{min}$ DEPENDING ON VEHICLE SPEED OFFSETTING OF ACCELERATOR OPENING WHEN CURRENT ACCELERATION $\alpha_c$ FAILS TO ACHIEVE MINIMUM ACCELERATION $\alpha_{min}$ MODIFIED EXAMPLE OF VARIATIONS IN ACCELERATOR OPENING WHEN ACCELERATOR SENSOR HAS DEVELOPED A FAULT FAULT EVENT NO. 1 IN SHIFT POSITION SENSOR
(Faulty Closure Of Switch-type Sensor)

FAULT EVENT NO. 2 IN SHIFT POSITION SENSOR
(Shift Of Analog Sensor Output)

When P range is selected. (Inoperable)

MISMATCH BETWEEN
SP1 AND SP2

When D range is selected. (D range is operable)

MATCH BETWEEN
SP1 AND SP2

VEHICLE CONTROL USING MULTIPLE SENSORS

BACKGROUND OF THE INVENTION

1. Field of the Invention

The present invention relates to a vehicle control technique featuring multiple sensors, and more particularly to a control technique performed when some of the sensors have developed a fault.

2. Description of the Related Art

Two sensors for providing redundant control inputs are sometimes used in order to enhance the reliability of a control system. When the two sensors operate normally, the control inputs obtained therefrom are substantially equal to each other. However, the two control inputs differ greatly from each other when either sensor develops a fault. An important question is how to perform control in such cases.

JPA 9-191501 describes a technique in which control is continued using only one accelerator sensor when one of the two accelerator sensors in an electric vehicle exceeds the upper or lower limit of a normal output range. It is disclosed that when this happens, abrupt variations in torque are limited by a method in which the torque command value presented to a motor control circuit is temporarily delayed or the torque command value is increased substantially rectilinearly.

Such direct control of abrupt variations in torque makes the driver uncomfortable because the resulting torque variations are markedly different from those experienced during normal driving. A need has therefore existed for a technique that would allow a vehicle to remain substantially as maneuverable as during a normal operation even when some accelerator sensors have developed a fault.

SUMMARY OF THE INVENTION

Accordingly, an object of the present invention is to provide a novel technique for allowing a vehicle to be continuously controlled even when some accelerator sensor has developed a fault.

In order to attain the above and related objects of the present invention, there is provided a control device for controlling a vehicle using first and second accelerator sensors configured to provide an accelerator control input. The control device comprises a fault detector configured to detect that one of the first and second accelerator sensors has developed a fault; and an accelerator control input setting section configured to determine the accelerator control input using an output of a normal sensor other than a faulty sensor when the faulty sensor has been detected by the fault detector. The accelerator control input setting section divides a full range of output signal levels of the normal sensor into a plurality of regions including an opening region in which the accelerator control input increases at a first rate of change, and a closing region in which the accelerator control input decreases at a second rate of change, and determines a change in the accelerator control input depending on which of the plurality of regions contains the output signal level of the normal sensor.

In a preferred embodiment, the fault detector detects the faulty sensor by analyzing variation patterns of outputs of the first and second accelerator sensors when the outputs of the first and second accelerator sensors remain within respective normal output ranges thereof.

The present invention can be realized as a variety of embodiments. Examples include vehicle control devices and methods, vehicles provided with such control devices, computer programs for executing the functions of such control devices and methods, recording media for storing such computer programs, and data signals embodied in a carrier wave including such computer programs.

These and other objects, features, aspects, and advantages of the present invention will become more apparent from the following detailed description of the preferred embodiments with the accompanying drawings.

BRIEF DESCRIPTION OF THE DRAWINGS

FIGS. 11(A) and 11(B) show detailed form the fault history area in EEPROM 282, FIG. 16 shows the manner in which the accelerator opening AOP varies in a second working example.

DESCRIPTION OF THE PREFERRED EMBODIMENT

Embodiments of the present invention will now be described according to the following sequence.

Figure 1:
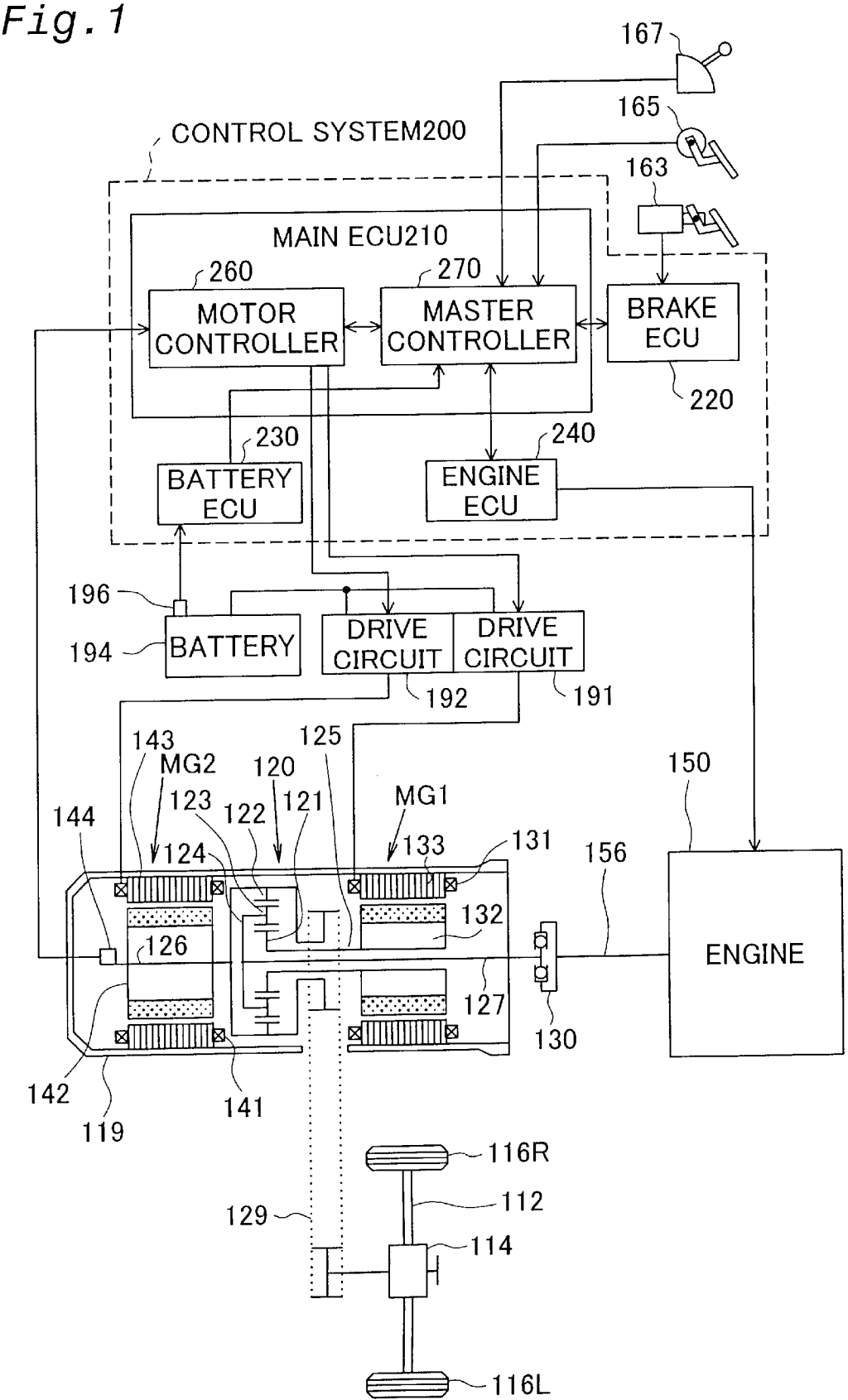
FIG. 1 shows the overall structure of a hybrid vehicle embodying the present invention.

A. Overall Structure of Hybrid Vehicle
B. Basic Operation of Hybrid Vehicle
C. Structure of Control System
D. Fault Detection for Accelerator sensors
E. Vehicle Control During Accelerator sensor Malfunction
   E1. First Working Example
   E2. Second Working Example
   E3. Third Working Example
   E4. Fourth Working Example
F. Fault Detection for Shift Position Sensors
G. Modifications A. Overall Structure of Hybrid Vehicle FIG. 1 shows the overall structure of a hybrid vehicle embodying the present invention. The hybrid vehicle comprises three prime movers: an engine 150 and two motor/generators MG1 and MG2. As used herein, the term "motor/generator" refers to a prime mover capable of functioning as a motor or a generator. For the sake of convenience, this will hereinafter be referred to merely as "a motor." The vehicle is controlled by a control system 200.

The control system 200 comprises a main ECU 210, a brake ECU 220, a battery ECU 230, and an engine ECU 240. Each ECU is configured as a unit in which a microcomputer, an input interface, an output interface, and a plurality of other circuit elements are mounted on a single circuit substrate. The main ECU 210 comprises a motor controller 260 and a master controller 270. The function of the master controller 270 is to set controlled variables such as the distribution of the outputs produced by the three prime movers 150, MG1, and MG2.

The engine 150 is a common gasoline engine that rotates a crankshaft 156. The operation of the engine 150 is controlled by the engine ECU 240. The engine ECU 240 controls the fuel injection of the engine 150 and other parameters in accordance with the commands from the master controller 270.

The motors MG1 and MG2, constructed as synchronous motors, comprise rotors 132 and 142 provided with a plurality of permanent magnets on the external peripheral surface, and stators 133 and 143 provided with three-phase coils 131 and 141 for generating a rotating magnetic field. The stators 133 and 143 are fixed to a casing 119. The three-phase coils 131 and 141 wound on the stators 133 and 143 of the motors MG1 and MG2 are connected to a secondary battery 194 via drive circuits 191 and 192, respectively. The drive circuits 191 and 192 are transistor inverters provided with a pair of transistors as switching elements for each phase. The drive circuits 191 and 192 are controlled by a motor controller 260. Electric current flows between the battery 194 and the motors MG1 and MG2 when the transistors of the drive circuits 191 and 192 are switched on by a control signal from the motor controller 260. The motors MG1 and MG2 can receive power from the battery 194 to generate a driving force (this operating mode will hereinafter be referred to as "power mode"), or they can function as power generators that generate an electromotive force across the three-phase coils 131 and 141 and charge the battery 194 when the rotors 132 and 142 are rotated by an outside force (this operating mode will hereinafter be referred to as "regeneration mode").

The shafts of the engine 150 and motors MG1 and MG2 are mechanically coupled with each other by a planetary gear 120. The planetary gear 120 comprises a sun gear 121, a ring gear 122, and a planetary carrier 124 having planetary pinion gears 123. In the hybrid vehicle of the present working example, the crankshaft 156 of the engine 150 is linked to a planetary carrier shaft 127 by a damper 130. The damper 130 is provided for the purpose of absorbing the torsional vibrations generated by the crankshaft 156. The rotor 132 of the motor MG1 is linked to a sun gear shaft 125. The rotor 142 of the motor MG2 is linked to a ring gear shaft 126. Rotation of the ring gear 122 is transmitted to an axle 112 and wheels 116R and 116L via a chain belt 129 and a differential gear 114.

The control system 200 is provided with various sensors for controlling the entire system, such as an accelerator sensor 165 for sensing the distance traveled by the accelerator pedal depressed by the driver, a shift position sensor 167 for sensing the position of the shift lever, a brake sensor 163 for sensing the pressure with which the brake pedal is depressed, a battery sensor 196 for sensing the charge state of the battery 194, and an rpm sensor 144 for measuring the rotational speed of the motor MG2. Because the ring gear shaft 126 and the axle 112 are mechanically linked by the chain belt 129, the ring gear shaft 126 and axle 112 have a constant rotational speed ratio. Consequently, the rpm sensor 144 provided to the ring gear shaft 126 senses not only the rotational speed of the motor MG2 but also the rotational speed of the axle 112.

B. Basic Operation of Hybrid Vehicle

The operation of the planetary gear 120 will first be described as part of a description concerning the basic operation of the hybrid vehicle. The planetary gear 120 has a property whereby setting the rotational speeds of two out of the three shafts described above will determine the rotational speed of the remaining shaft. The relation between the rotational speeds of these shafts will be defined by Eq. (1) below.

$$Nc = Ns \times \rho/(1+\rho) + Nr \times 1/(1+\rho) \quad (1),$$

where Nc is the rotational speed of the planetary carrier shaft 127, Ns the rotational speed of the sun gear shaft 125, and Nr the rotational speed of the ring gear shaft 126. In addition, ρ is the gear ratio of the sun gear 121 and ring gear 122, as expressed by the following equation.

$$\rho = \text{(Number of teeth of sun gear 121)/(Number of teeth of ring gear 122)}$$

In addition, the torques of the three shafts are independent of the rotational speed and follow the constant relations given by Eqs. (2) and (3) below.

$$Ts = Tc \times \rho/(1+\rho) \quad (2)$$

$$Tr = Tc \times 1/(1+\rho) = Ts/\rho \quad (3),$$

where Tc is the torque of the planetary carrier shaft 127, Ts the torque of the sun gear shaft 125, and Tr the torque of the ring gear shaft 126.

Because the planetary gear 120 has such functions, the hybrid vehicle of the present embodiment can travel in a variety of modes. When, for example, the hybrid vehicle is in a comparatively low-speed mode after the start from standstill, driving force is transmitted to the axle 112 and the vehicle is propelled by the supply of power to the motor MG2 while the engine 150 is stopped. Similarly, the vehicle may sometimes be propelled while the engine 150 is idling.

When the hybrid vehicle has reached a prescribed speed following startup, the control system 200 powers the motor MG1, and the engine 150 is started by the outputted torque from the motor MG1. In the process, the reaction torque of the motor MG1 is also outputted to the ring gear 122 via the planetary gear 120.

When the engine 150 is operated and the planetary carrier shaft 127 rotated, the sun gear shaft 125 and ring gear shaft 126 are rotated under conditions that satisfy Eqs. (1) to (3) above. The driving force resulting from the rotation of the ring gear shaft 126 is directly transmitted to the wheels 116R and 116L. The driving force resulting from the rotation of the sun gear shaft 125 can be regenerated as electric power by the first motor MG1. Powering the second motor MG2 allows driving force to be outputted to the wheels 116R and 116L via the ring gear shaft 126.

During stable operation, the output of the engine 150 is set to a value substantially equal to the required driving force of the axle 112 (namely, Torque×Rotational speed of axle 112). In the process, part of the output of the engine 150 is transmitted directly to the axle 112 via the ring gear shaft 126, and the remainder of the output is regenerated as electric power by the first motor MG1. The electric power thus regenerated is used to allow the second motor MG2 to generate a torque for rotating the ring gear shaft 126. As a result, the axle 112 can be driven by the desired torque at the desired rotational speed.

If the torque transmitted to the axle 112 is insufficient, this torque is assisted by the second motor MG2. The electric power regenerated by the first motor MG1 and the electric power stored in the battery 194 are used as the assisting electric power. Thus, the control system 200 controls the operation of the two motors MG1 and MG2 in accordance with the required driving force to be outputted to the axle 112.

The hybrid vehicle of the present embodiment can also move backward while the engine 150 operates. When the engine 150 operates, the planetary carrier shaft 127 rotates in the same direction as during the forward movement. At this time, the ring gear shaft 126 reverses to the backward direction if the first motor MG1 is controlled such that the sun gear shaft 125 is rotated at a higher rotational speed than the rotational speed of the planetary carrier shaft 127, as can be seen from Eq. (1) above. The control system 200 can propel the hybrid vehicle backward by controlling the torque output of the second motor MG2 while rotating it backward.

The planetary gear 120 can rotate the planetary carrier 124 and sun gear 121 while the ring gear 122 remains stationary. Consequently, the engine 150 can be operated even when the vehicle does not move. When, for example, the remaining capacity of the battery 194 is low, the battery 194 can be charged by operating the engine 150 and letting the first motor MG1 to operate in a regenerating mode. When the vehicle is stationary, the first motor MG1 can be powered, and the engine 150 can be started by the torque of the motor.

C. Structure of Control System

Figure 2:
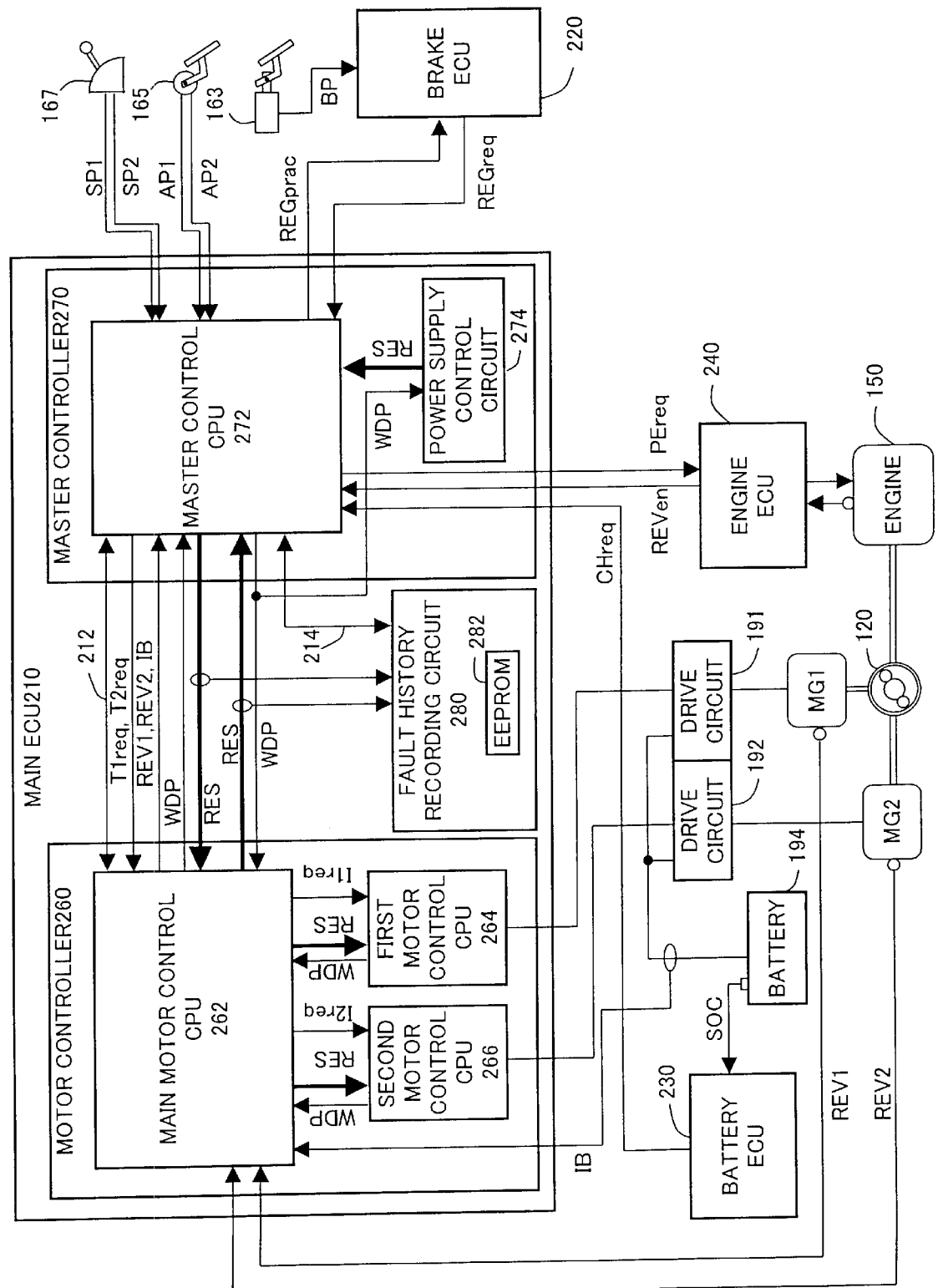
FIG. 2 is a block diagram depicting a more detailed structure of the control system 200.

FIG. 2 is a block diagram showing a more detailed structure of the control system 200 used in the embociment. The master controller 270 comprises a master control CPU 272 and a power supply control circuit 274. The motor controller 260 comprises a main motor control CPU 262 and two motor control CPUs 264 and 266 for controlling the motors MG1 and MG2, respectively. Each CPU is a single-chip microcomputer including a CPU, a ROM, a RAM, an input port, and an output port.

The main function of the master control CPU 272 is to determine the rotational speeds, torque distribution, and other controlled variables of the three prime movers 150, MG1, and MG2; to feed the required values to other CPUs or ECUs; and to control the drive of each prime mover. To be able to perform such control, the master control CPU 272 is furnished with various control inputs such as accelerator position signals AP1 and AP2 for indicating the accelerator opening, and shift position signals SP2 and SP2 for indicating shift positions. The term "accelerator opening" means an accelerator control input in this specification. The accelerator sensor 165 and shift position sensor 167 each have a redundant configuration to provide the master control CPU 272 with two accelerator position signals AP1 and AP2 and two shift position signals SP2 and SP2.

The power supply control circuit 274 is a circuit for converting the high DC voltage of the battery 194 to a low DC voltage for the circuits inside the main ECU 210. The power supply control circuit 274 also functions as a monitoring circuit that monitors the master control CPU 272 for faults.

The engine ECU 240 controls the engine 150 in accordance with the required engine output value PEreq received from the master control CPU 272. The rotational speed REVen of the engine 150 is fed back to the master control CPU 272 from the engine ECU 240.

The main motor control CPU 262 feeds required current values I1req and I2req to the respective motor control CPUs 264 and 266 in accordance with the required torque values T1req and T2req pertaining to the motors MG1 and MG2 and arriving from the master control CPU 272. The motor control CPUs 264 and 266 control their respective drive circuits 191 and 192 in accordance with the required current values I1req and I2req to drive the motors MG1 and MG2. The rotational speeds REV1 and REV2 of the motors MG1 and MG2 are fed back to the main motor control CPU 262 from the rpm sensors of the motors MG1 and MG2. The rotational speeds REV1 and REV2 of the motors MG1 and MG2, and the electric current value IB of the battery 194 for the drive circuits 191 and 192 are fed back to the master control CPU 272 from the main motor control CPU 262.

The battery ECU 230 monitors the charging conditions SOC (State Of Cell) of the battery 194 and sends the required charging value CHreq of the battery 194 to the master control CPU 272 as needed. The master control CPU 272 takes this required value CHreq into account and determines the output of each prime mover. When charging is required, a driving force greater than the output needed for propulsion is outputted by the engine 150, and a portion thereof is distributed to allow the first motor MG1 to perform a charging operation.

The brake ECU 220 performs a control routine aimed at achieving a balance between a hydraulic brake (not shown) and a regeneration brake involving the second motor MG2. This is because this hybrid vehicle is constructed such that the second motor MG2 performs a regeneration operation during braking to charge the battery 194. Specifically, the brake ECU 220 inputs a regeneration request value REGreq to the master control CPU 272 on the basis of the brake pressure BP from the brake sensor 163. The master control CPU 272 determines the operation mode of the motors MG1 and MG2 on the basis of the request value REGreq and feeds back a regeneration practical value REGprac to the brake ECU 220. The brake ECU 220 sets the braking exerted by the hydraulic brake to an appropriate level on the basis of the brake pressure BP and the difference between the regeneration practical value REGprac and the regeneration request value REGreq.

Thus, the master control CPU 272 determines the outputs of the prime movers 150, MG1, and MG2 and sends the required values to the ECU 240 or the CPU 264 or 266 for controlling these movers. The ECU 240 or the CPU 264 or 266 controls each prime mover according to the required values. As a result, the hybrid vehicle can travel while appropriate driving force is outputted from the axle 112 in accordance with the running condition. During braking, the brake ECU 220 and the master control CPU 272 cooperate with each other in controlling the operation of the prime movers or hydraulic brake. This allows braking to be performed and electric power regenerated without creating any discomfort for the driver.

The four CPUs 272, 262, 264, and 266 have a function whereby mutual faults are monitored by means of so-called watchdog pulses WDP, and when one CPU develops a fault and the watchdog pulses stop, a reset signal RES is fed to the CPU, which is thus reset. The master control CPU 272 is also monitored for faults by the power supply control circuit 274.

A fault history recording circuit 280 is also provided. This circuit has an EEPROM 282 for recording fault history. The fault history of the accelerator sensor 165 or shift position sensor 167 is recorded in the EEPROM 282. The reset signals RES1 and RES2 transmitted between the master control CPU 272 and the main motor control CPU 262 are inputted to the input ports of the fault history recording circuit 280. When generated by the fault history recording circuit 280, these reset signals RES1 and RES2 are stored in the internal EEPROM 282.

The master control CPU 272 and fault history recording circuit 280 exchange requests and notifications via a two-way communication line 214. A two-way communication line 212 is also extended between the master control CPU 272 and the main motor control CPU 262.

D. Fault Detection for Accelerator sensors

Figure 3:
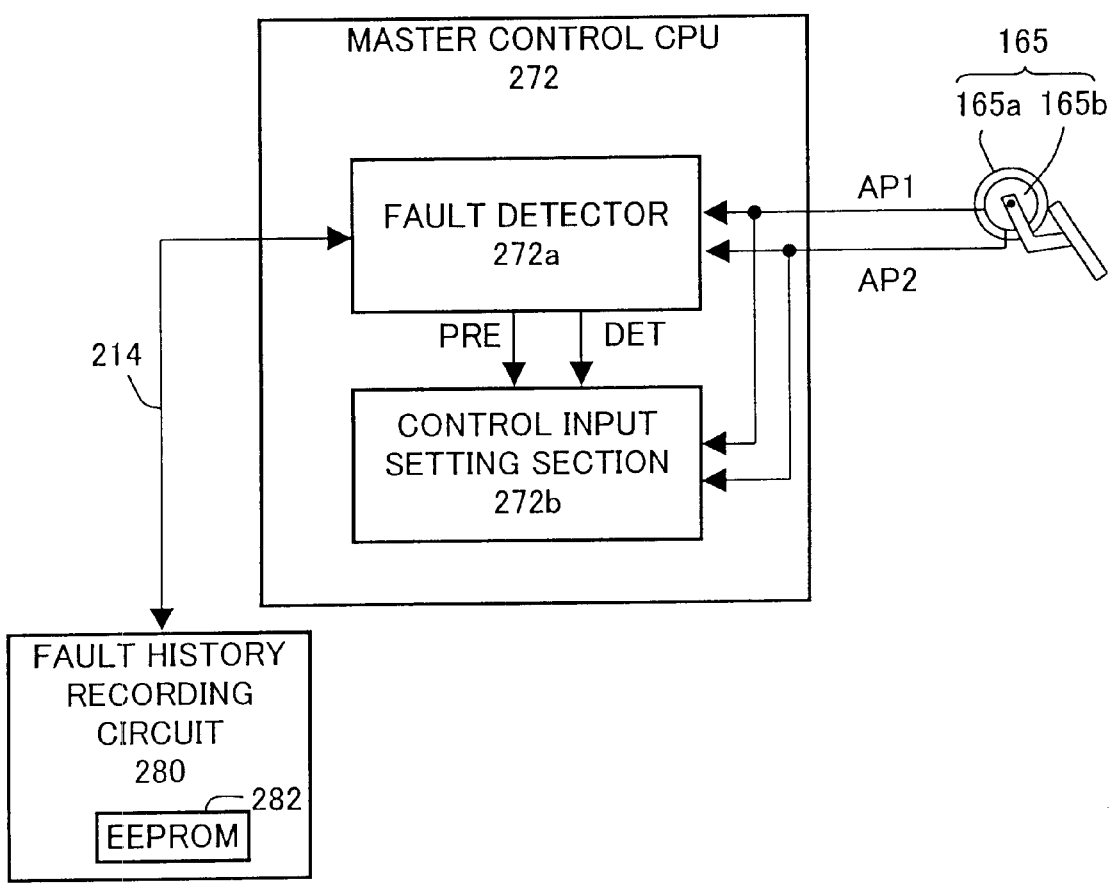
FIG. 3 is a block diagram depicting a circuit structure related to the processing of signals outputted by an accelerator sensor.

FIG. 3 is a block diagram depicting a circuit structure related to the processing of signals outputted by the accelerator sensor. The accelerator sensor 165 comprises two sensors 165a and 165b having different characteristics. These sensors 165a and 165b may, for example, be potentiometers. The output signals AP1 and AP2 of the two sensors 165a and 165b are inputted to the master control CPU 272.

The master control CPU 272 has the functions of a fault detector 272a and a control input setting section 272b. The fault detector 272a detects whether the accelerator sensor 165 or the shift position sensor 167 has developed a fault. The control input setting section 272b ordinarily sets the control input (for example, the accelerator opening or shift position) on the basis of normal outputs from the sensor. When the sensor develops a fault, however, the control input used in the CPU 272 is set using a sensor output that does not have any faults. The functions of the sections 272a and 272b are implemented by computer programs stored in a ROM (not shown) within the CPU 272.

When the accelerator sensor 165 develops a fault, information about this fault is recorded in the EEPROM 282 inside the fault history recording circuit 280.

Figure 4A:
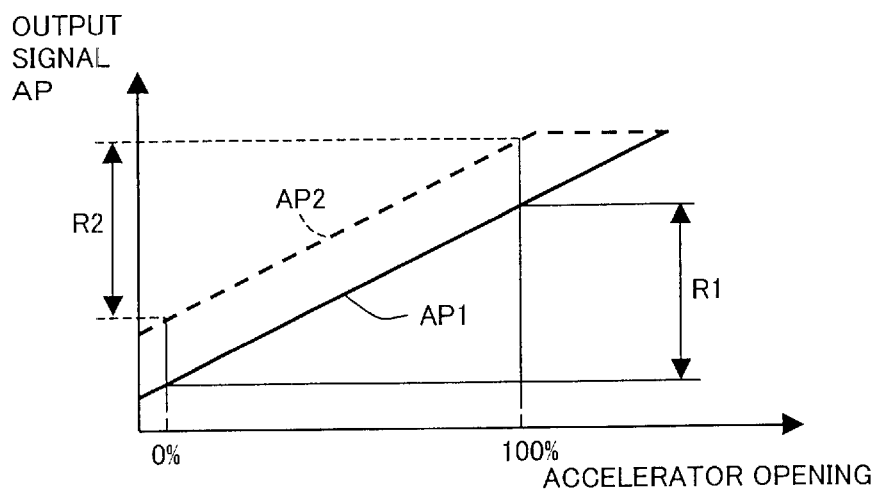
FIGS. 4(A) and 4(B) show the characteristics of the two sensors constituting the accelerator sensor 165.

FIG. 4(A) is a graph depicting the input/output characteristics of the accelerator sensor 165. The depression distance of the accelerator pedal is plotted on the horizontal axis, and the level of the accelerator position signal is plotted on the vertical axis. The output signals AP1 and AP2 outputted by the two sensors have the same gradient but mutually different offsets. It is also possible to set different values for the gradients of the two output signals AP1 and AP2.

The normal output ranges R1 and R2 of the two sensors are selected to provide a unique relation between the accelerator opening (depression distance of the accelerator pedal) and each of the sensor outputs AP1 and AP2. In the example shown in FIG. 4(A), the normal output ranges R1 and R2 are set to provide linear relations between the accelerator opening and each of the sensor outputs AP1 and AP2.

Figure 4B:
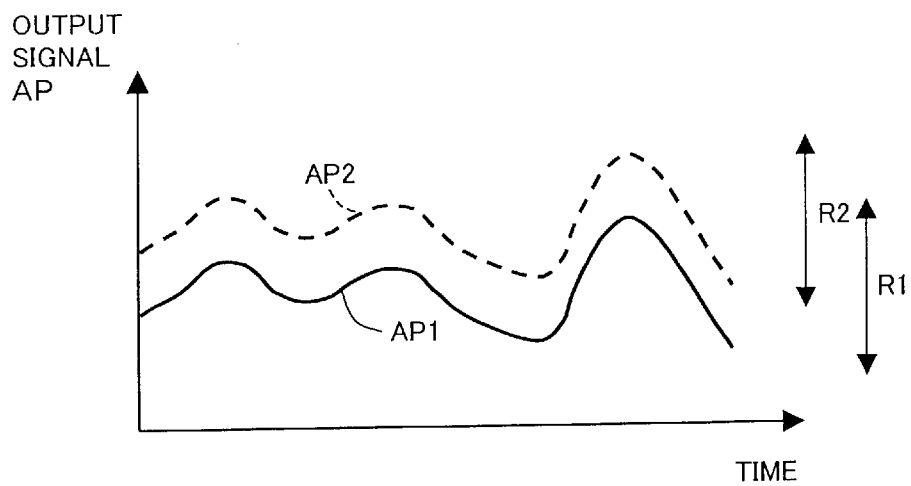

FIG. 4(B) depicts an example of varying accelerator position signals when the two sensors operate normally. When the two operate normally, the control input setting section 272b (FIG. 3) sets the control input (accelerator opening) on the basis of the first output signal AP1. The accelerator opening may also be set on the basis of the second output signal AP2.

The fault detector 272a (FIG. 3) determines whether the two accelerator sensors have developed a fault. In the present embodiment, the fault detector 272a detects a sensor fault by determining whether the temporary varying pattern of the output signal AP1 or AP2 produced by the sensor corresponds to any of a plurality of preset fault patterns. FIGS. 5 to 9 show examples of fault events occurring in an accelerator sensor.

Figure 5:
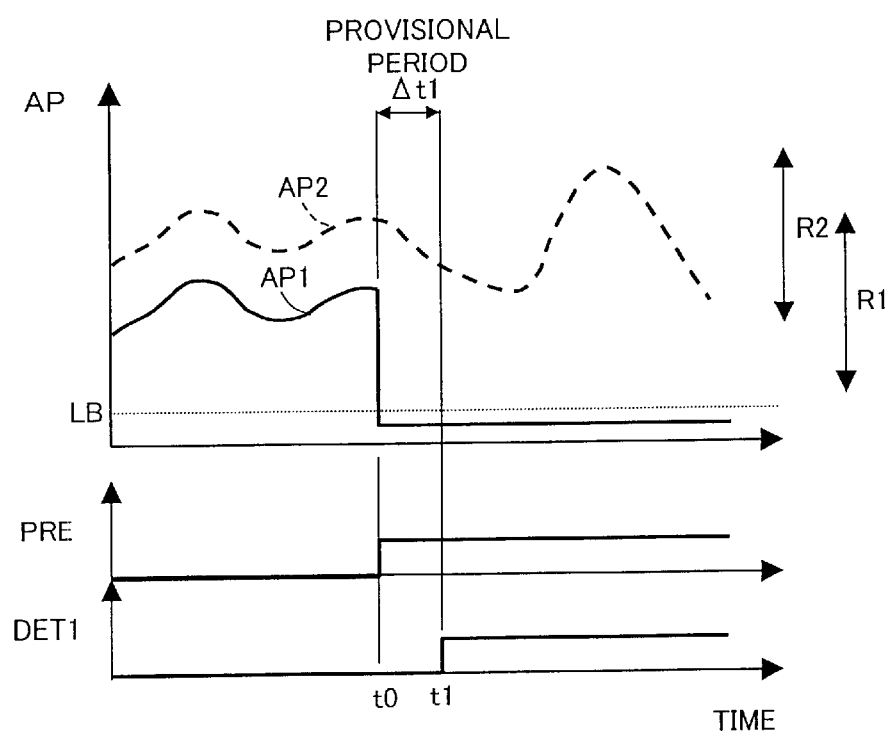
FIG. 5 shows fault event No. 1 in an accelerator sensor.

FIG. 5 shows a varying output signal generated when a fault event No. 1 (breakage of the signal line in a sensor) has occurred in the first accelerator sensor 165a. When the signal line of the first accelerator sensor 165a is broken, the output signal AP1 thereof decreases rapidly, falls below a prescribed breakage level LB, and falls outside the normal output range R1. The moment to the output signal AP1 falls below the breakage level LB, the fault detector 272a provides the control input setting section 272b with a preliminary fault notification PRE indicating that the sensor 165a has developed a fault. The fault detector 272a further concludes that the first accelerator sensor 165a has developed a fault (time $t_1$) if it is confirmed that the output signal AP1 has remained below an offset F1 for a time greater than a predetermined period $\Delta t_1$. A fault detection command DET1 is sent to the control input setting section 272b to indicate that a fault event No. 1 has occurred in the first accelerator sensor 165a. The reason a provisional period is set up for the fault detection procedure is to prevent a fault resulting from a temporary variation in the output from being erroneously detected.

Beyond the time $t_1$, the master control CPU 272 determines the accelerator opening on the basis of the normally operating second sensor 165b without the use of the faulty first accelerator sensor 165a. The vehicle can thus be continuously controlled even when one of the two sensors 165a and 165b has developed a fault.

In the fault period extending beyond time ti, the accelerator opening may be determined from the signal AP2 to have a lower level than the one adopted when the two sensors are in a normal state, instead of employing the input/output characteristics of the second sensor 165b show in FIG. 4(A). For example, the accelerator opening used for the actual control may be obtained by a procedure in which the accelerator opening directly obtained from the output signal AP2 of the second sensor 165b is multiplied by a prescribed coefficient less than 1 (for example, 0.9). This approach makes it possible to smooth the increase in vehicle acceleration when one of the sensors develops a fault and the outputs of the remaining sensors increase dramatically.

The period from $t_0$ to $t_1$ is a provisional period during which it is finally determined whether a fault has occurred. During this provisional period $\Delta t_1$, the control input setting section 272b may set the accelerator opening by a method different from the one used when both sensors 165a and 165b operate normally. During the provisional period $\Delta t_1$, for example, the accelerator opening may be set using the output signal AP2 of the second sensor 165b rather than the output signal of the sensor 165a, which is a sensor likely to develop a fault. Whether a sensor is likely to develop a fault can be decided by determining whether the sensor output varies at a rate of change greater than a predetermined threshold value.

Although the example in FIG. 5 was described with reference to a case in which the first accelerator sensor 165a had developed a fault, the same processing routine can be performed when the situation is reversed, that is, when the first accelerator sensor 165a operates normally but the second sensor 165b develops a fault. The same applies to the other fault events described below. In addition, the above-described methods for determining the accelerator opening in the fault period and provisional period can be applied in the same manner to the fault events described below.

Figure 6:
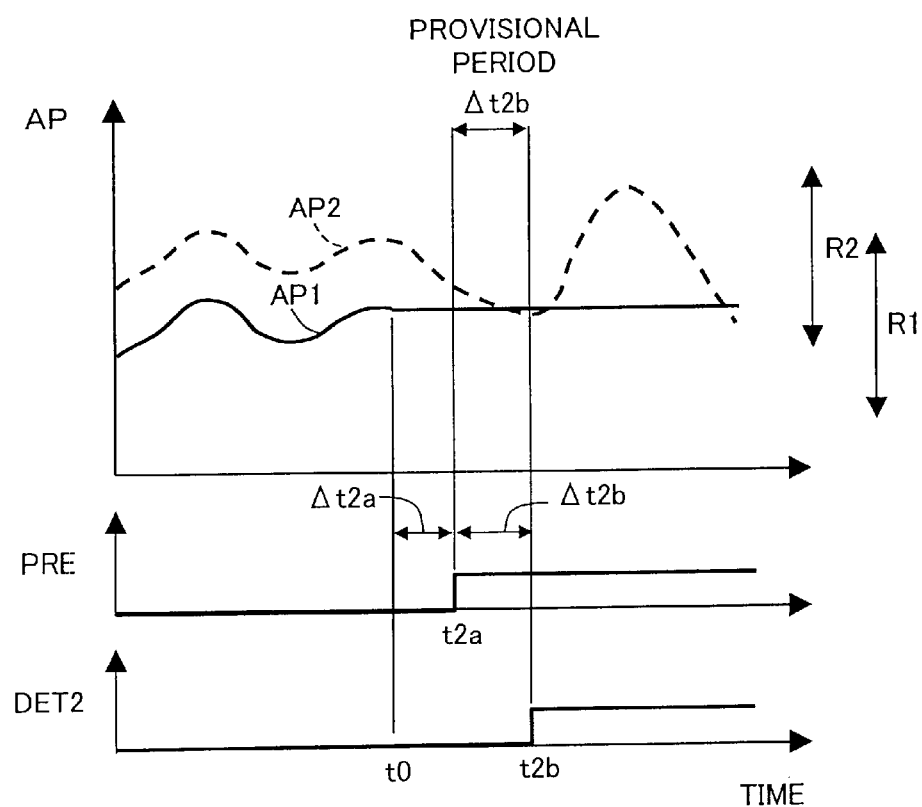
FIG. 6 shows fault event No. 2 in an accelerator sensor.

FIG. 6 shows a varying output signal generated when a fault event No. 2 (Hold) has occurred in the first accelerator sensor 165a. As used herein, "Hold" refers to a situation in which an output signal remains constant, or to a fixed state of sensor output unobtainable in the case of normal sensor operation. When an accelerator sensor operates normally, it is extremely difficult for the driver to keep the accelerator pedal in a constant position such that the output signal of the sensor is kept constant. It can therefore be concluded that the accelerator sensor has developed a fault when the output signal of the sensor remains constant.

In the case shown in FIG. 6, the fault detector 272a sends a preliminary fault notification PRE to the control input setting section 272a if a prescribed period $\Delta t_{2a}$ has elapsed after the output signal AP1 has become constant (time $t_{2a}$). When the fault detector 272a confirms that the level of the output signal AP1 has been further sustained for a predetermined period $\Delta t_{2b}$, it is concluded that the first accelerator sensor 165a has developed a fault (time $t_{2b}$). A fault detection signal DET2 is then sent to the control input setting section 272b to indicate that the first accelerator sensor 165a has developed a fault event No. 2.

The master control CPU 272 deteremines the accelerator opening on the basis of the normally operating second sensor 165b without using the faulty first sensor 165a beyond the time $t_2$. Consequently, the vehicle can be continuously controlled even when one of the two sensors 165a and 165b has developed a fault.

Fault event No. 2 is characterized in that the outputs of the two sensors 165a and 165b remain within their corresponding normal output ranges R1 and R2. In conventional practice, such a fault event makes it difficult to determine which sensor has developed a fault. In the present embodiment, the fault detector 272a detects a sensor fault by determining whether the temporal variation pattern of the output signal produced by an accelerator sensor corresponds to the preset pattern of fault event No. 2 (Hold). As a result, the fault can be detected even when the sensor output remains within its normal range.

Figure 7:
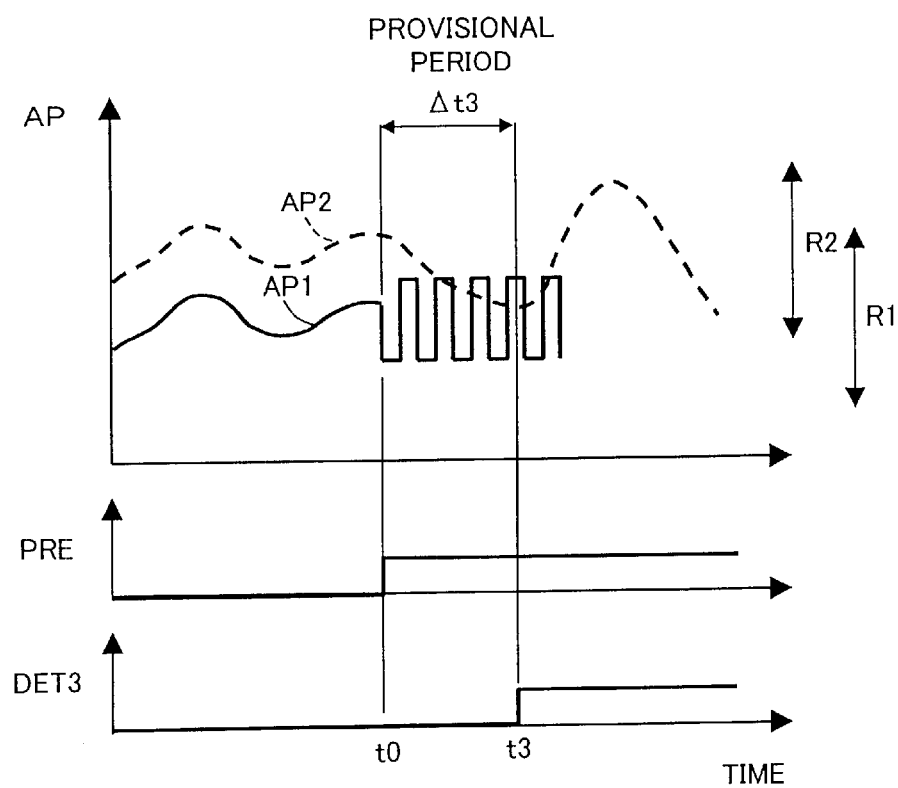
FIG. 7 shows fault event No. 3 in an accelerator sensor.

FIG. 7 shows variations induced in an output signal when a fault event No. 3 (Square Waveform Oscillation) has occurred in the first accelerator sensor 165a. When an accelerator sensor operates normally, it is extremely difficult for the driver to press on the accelerator pedal such that the output signal of the sensor changes to a square waveform. It can therefore be concluded that the accelerator sensor has developed a fault when the output signal of the sensor has changed to a square waveform.

The fault detector 272a provides the control input setting section 272b with a preliminary fault notification PRE if the output signal AP1 varies abruptly at a rate of change greater than a predetermined threshold value at time $t_0$ in FIG. 7. The fault detector 272a concludes that the first accelerator sensor 165a has developed a fault (time $t_3$) if it is confirmed that the change in the square waveform of the output signal AP1 has continued for a predetermined period $\Delta t_3$. A fault detection command DET3 is sent to the control input setting section 272b to indicate that a fault event No. 3 has occurred in the first accelerator sensor 165a.

The master control CPU 272 determines the accelerator opening on the basis of the normally operating second sensor 165b without using the faulty first sensor 165a beyond the time $t_3$. Consequently, the vehicle can be continuously controlled even when one of the two sensors 165a and 165b has developed a fault. Fault event No. 3 is a phenomenon during which the outputs of the two sensors 165a and 165b remain within the normal output ranges R1 and R2.

Figure 8:
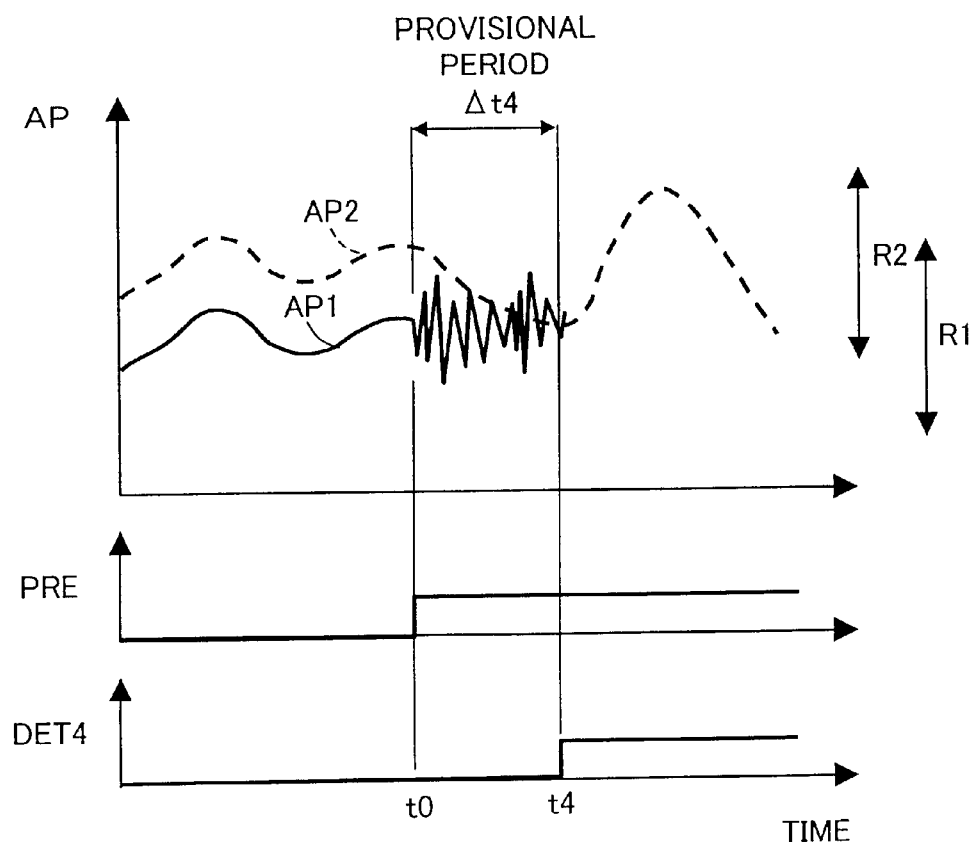
FIG. 8 shows fault event No. 4 in an accelerator sensor.

FIG. 8 shows variations induced in an output signal when a fault event No. 4 (Irregular Oscillation) has occurred in the first accelerator sensor 165a. When an accelerator sensor operates normally, it is extremely difficult for the driver to press on the accelerator pedal such that the output signal of the sensor varies abruptly in an irregular manner. It can therefore be concluded that the accelerator sensor has developed a fault when the output signal of the sensor varies abruptly in an irregular manner.

The fault detector 272a provides the control input setting section 272b with a preliminary fault notification PRE if the output signal AP1 varies abruptly at a rate of change greater than a predetermined threshold value at time $t_0$ in FIG. 8. The fault detector 272a concludes that the first accelerator sensor 165a has developed a fault (time $t_4$) if it is confirmed that the irregular variation of the output signal AP1 has continued for a predetermined period $\Delta t_4$. A fault detection command DET4 is sent to the control input setting section 272b to indicate that a fault event No. 4 has occurred in the first accelerator sensor 165a.

The master control CPU 272 determines the accelerator opening on the basis of the normally operating second sensor 165b without using the faulty first sensor 165a beyond the time $t_4$. Consequently, the vehicle can be continuously controlled even when one of the two sensors 165a and 165b has developed a fault. Fault event No. 4 is a phenomenon during which the outputs of the two sensors 165a and 165b remain within the normal output ranges R1 and R2.

Fault event Nos. 3 and 4 are phenomena that are classed as oscillations affecting output signals, and may thus be recorded as the same type of event. The decision to categorize a fault as a fault event No. 3 or 4 can be made by analyzing the magnitude of the rate of change of the output signal, the frequency thereof (that is, the spectrum of such rates of change), and other unique oscillation characteristics.

Figure 9:
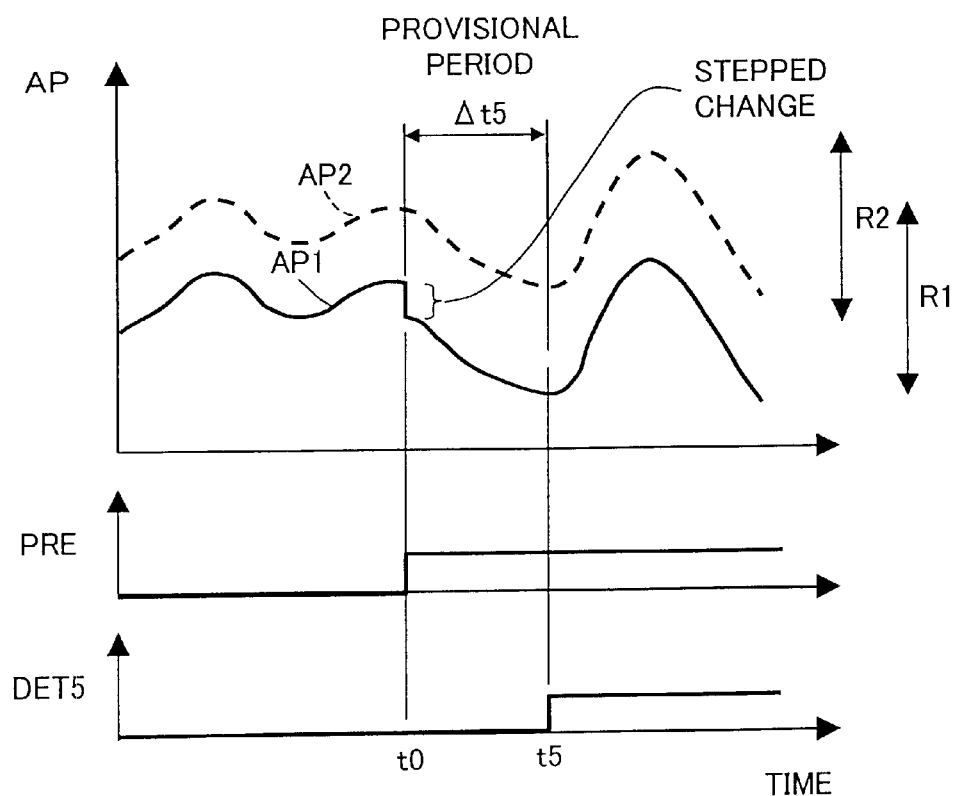
FIG. 9 shows fault event No. 5 in an accelerator sensor.

FIG. 9 shows variations induced in an output signal when a fault event No. 5 (Differential Fault) has occurred in the two accelerator sensors 165a and 165b. The difference between the two output signals AP1 and AP2 must lie within a substantially constant appropriate range when the accelerator sensors operate normally. For example, the difference between the two output signals AP1 and AP2 remains substantially constant when the two input/output characteristics shown in FIG. 4(A) have the same gradients. It can therefore be concluded that one of the sensors has developed a fault if the difference between the output signals of the two accelerator sensor falls outside a constant appropriate range.

The fault detector 272a provides the control input setting section 272b with a preliminary fault notification PRE if the output signal AP1 changes and the difference between the two signals reaches a predetermined threshold value at time $t_0$ in FIG. 9. The fault detector 272a concludes that the sensor 165a or 165b has developed a fault (time $t_5$) if it is confirmed that the irregular difference has persisted for a predetermined period $\Delta t_5$. In this case, it may, for example, be concluded that the sensor with the greater output variation (165a in the example shown in FIG. 9) has developed a fault at time $t_0$ (which is the time when the difference became irregular). At this time, the fault detector 272a sends a fault detection command DET5 to the control input setting section 272b to indicate that a fault event No. 5 has occurred in the first accelerator sensor 165a.

The master control CPU 272 determines the accelerator opening on the basis of the normally operating second sensor 165b without using the faulty first sensor 165a beyond the time $t_5$. Consequently, the vehicle can be continuously controlled even when one of the two sensors 165a and 165b develops a fault. During a fault event No. 5, a sensor fault can also be detected while the outputs of the two sensors 165a and 165b remain within their normal output ranges R1 and R2.

In the event of a differential fault, the accelerator opening may also be determined using the sensor output that provides a smaller accelerator opening in the provisional period $\Delta t_5$. This method for setting the accelerator opening (control input) can also be applied to the other fault events described above.

Figure 10:
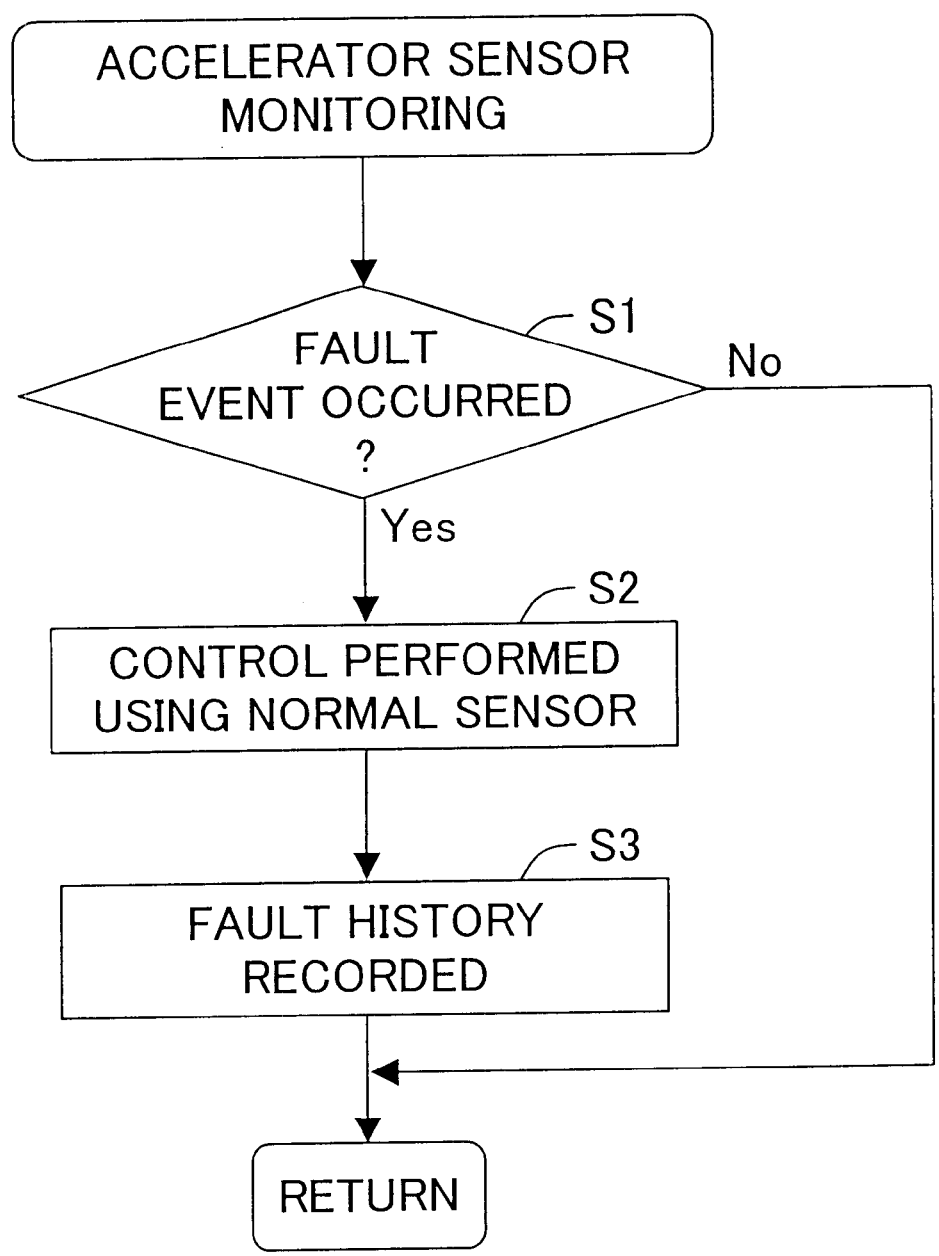
FIG. 10 is a flowchart of the processing sequence performed by the fault master control CPU 272 to detect faults in an accelerator sensor.

FIG. 10 is a flowchart depicting the processing routine performed by the master control CPU 272 to detect faults in an accelerator sensor. The processing routine is initiated and executed at regular time intervals. In step S1, the fault detector 272a performs inspections at regular time intervals to determine whether a fault event has occurred. The routine is completed if no fault event has occurred in the accelerator sensor 165. If it is concluded that a fault event has indeed occurred in the accelerator sensor 165, the operation proceeds to step S2, and the control routine is then continued using the normal sensor. In step S3, a record is made in the fault history recording circuit 280 of the EEPROM 282 (FIG. 3) that a fault has occurred in a sensor.

FIGS. 11(A) and 11(B) show in detailed form the fault history area in the EEPROM 282. Flags indicating whether any of the five fault event (Nos. 1–5) have occurred during each trip can be recorded in the fault history area. A used herein, the term "trip" refers to a single journey (time between the insertion and removal of the ignition key) of a vehicle. A pointer PT for indicating the latest trip is also recorded in the EEPROM 282.

FIG. 11(A) shows the state achieved when the fault history area is initialized. FIG. 11(B) shows the state existing after three trips have been made. In this example, the two sensors 165a and 165b operate normally during the initial trip, a Differential Fault develops during the second trip, and a Hold develops during the third trip.

Because the fault history is recorded in the EEPROM 282 in such a manner, it is possible to determine what types of faults have occurred during each journey by connecting a service computer to the control system 200 and analyzing the fault history stored in the EEPROM 282.

As described above, the outputs of the two sensors 165a and 165b remain within the normal output ranges R1 and R2 for four (Nos. 2–5) out of the five fault events (Nos. 1–5) that have been preset for the accelerator sensors. In the process, the fault detector 272a detects a sensor fault by determining whether the temporal variation patterns of the signals outputted by the accelerator sensors correspond to a plurality of preset fault event patterns, and can therefore detect a fault even when the outputs of the two sensors fall within normal ranges. The control routine can be continued using the normal sensor if the other sensor develops a fault. The plurality of preset fault event patterns are stored in the ROM (not shown) of the master control CPU 272.

E. Vehicle Control During Accelerator sensor Malfunction

E1. First Working Example

When an accelerator sensor develops a fault, the control input setting section 272b (FIG. 3) may set the accelerator opening in the following manner in accordance with characteristics that are different from the input/output characteristics in FIG. 4(A).

Figure 12:
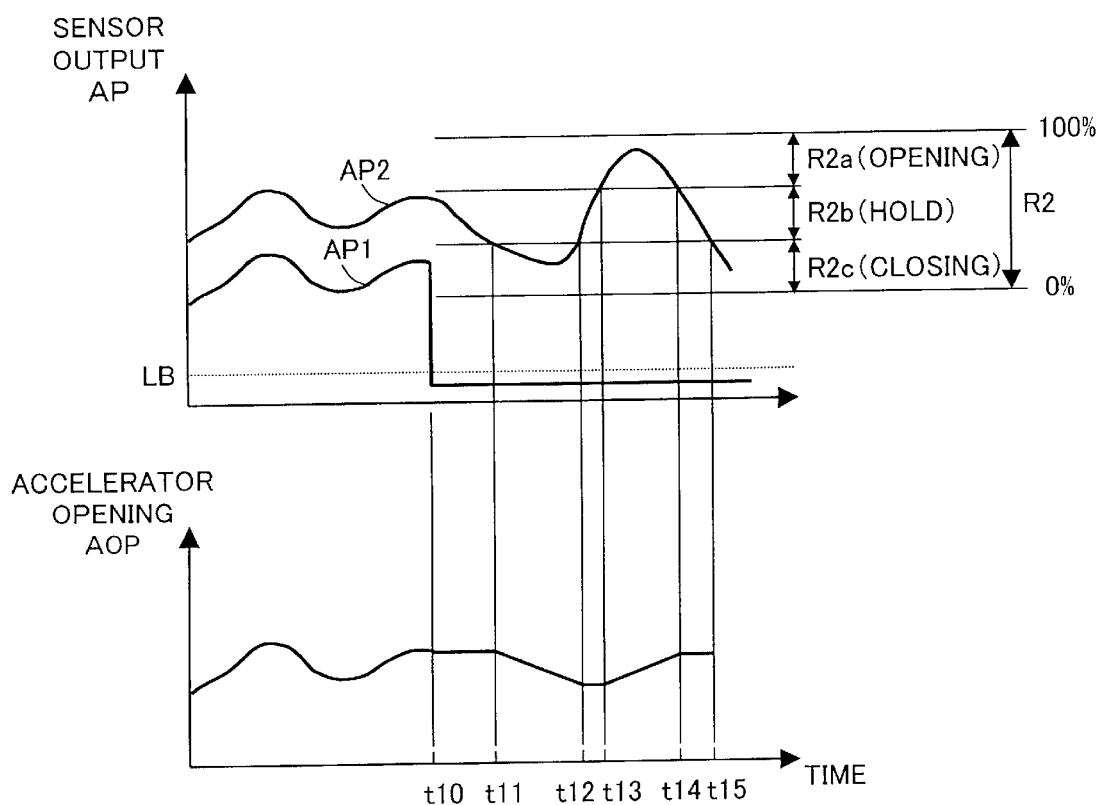
FIG. 12 shows a method for setting the accelerator opening AOP when one of two accelerator sensors has developed a fault.

FIG. 12 shows a method for setting the accelerator opening AOP when one of two accelerator sensors has developed a fault. The output signals AP1 and AP2 of the accelerator sensors vary in the same manner as the fault event No. 1 (Line Breakage) shown in FIG. 5. In FIG. 12, however, variations in the output signal AP2 of the second accelerator sensor are also shown by a solid line. The description that follows primarily refers to fault event No. 1, but the same control routine is also applicable to other types of fault events.

In FIG. 12, the output range R2 of a normal accelerator sensor is divided into three regions: an opening region R2a, a holding region R2b, and a closing region R2c. The control input setting section 272b sets the accelerator opening AOP depending on which of the three regions R2a, R2b, and R2c contains the sensor output AP2. Specifically, the accelerator opening AOP is allowed to increase at a prescribed rate when the sensor output AP2 falls within the opening region R2a. The accelerator opening AOP is preserved unchanged when the sensor output AP2 falls within the holding region R2b. The accelerator opening AOP is allowed to decrease at a prescribed rate when the sensor output AP2 falls within the closing region R2c. For example, the accelerator opening AOP is kept constant when the sensor output AP2 falls within the holding region R2b during period $t_{10}$–$t_{11}$ in FIG. 12. During period $t_{11}$–$t_{12}$, the accelerator opening AOP is reduced at a constant rate because the sensor output AP2 falls within the closing region R2c. Similarly, the accelerator opening AOP is kept constant during periods $t_{12}$–$t_{13}$ and $t_{14}$–$t_{15}$. During period $t_{13}$–$t_{14}$, the accelerator opening AOP decreases at a constant rate because the sensor output AP2 falls within the closing region R2c.

The positions of the borders between regions can be appropriately set with consideration for vehicle maneuverability. The border between the opening region R2a and the holding region R2b may, for example, be set to a position corresponding to about 50% of the level of sensor output AP2. The border between the holding region R2b and the closing region R2c may, for example, be set to a position corresponding to about 20% of the level of the sensor output AP2.

The rate of increase in the opening region R2a and the rate of decrease in the closing region R2c may have the same or different absolute values.

It is preferable that the accelerator opening AOP is forcibly set to zero when the driver steps on the brake pedal. In common practice, a driver removes his foot from the accelerator pedal when stepping on the brake pedal. If, however, an accelerator sensor has developed a fault, the sensor output AP2 falls within the closing region R2c even when the driver removes his foot from the accelerator pedal, so the accelerator opening AOP would decrease at a constant rate if the sector distribution shown in FIG. 12 were adopted, bringing about results that are contrary to the intentions of the driver. In view of this, the intentions of the driver can be better reflected by adopting an approach in which the accelerator opening AOP is forcibly set to zero when the driver has stepped on the brake pedal.

Figure 13:
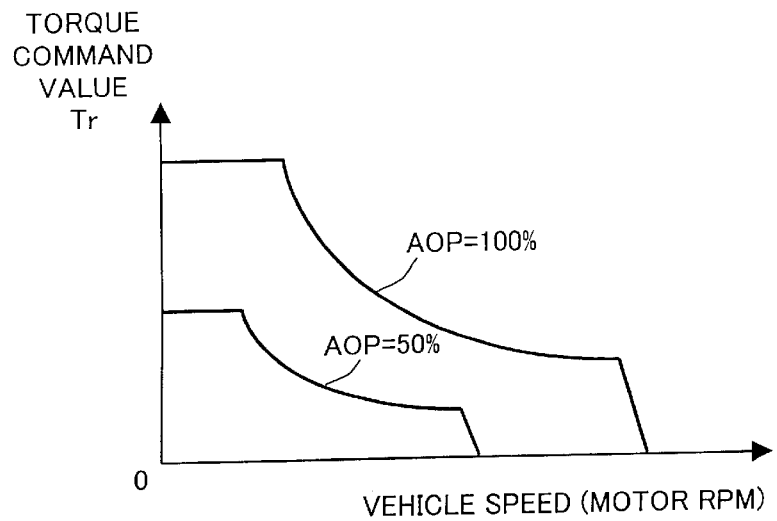
FIG. 13 shows an example of a torque command value/speed map selected in accordance with the accelerator opening AOP.

FIG. 13 shows an example of maps showing relation between a torque command value and a vehicle speed, one of which is to be selected in accordance with the accelerator opening AOP. As can be seen in this example, a map showing the relation between torque command value Tr (required torque value to be outputted to the axle) and vehicle speed is prepared in advance for each accelerator opening AOP. Such maps may, for example, be stored in the ROM (not shown) of the master control CPU 272. The rotational speed of the second motor MG2 (that is, the rotational speed of the ring gear 122) can be plotted instead of the vehicle speed on the horizontal axis in FIG. 13. The rotational speed is measured by the rpm sensor 144 (FIG. 1) provided to the second motor MG2.

The torque command value Tr is set based on the map if the accelerator opening AOP is set in accordance with the method of FIG. 12. The master control CPU 272 sets the rotational speeds and torque distribution of the three prime movers 150, MG1, and MG2 in accordance with the torque command value Tr and vehicle speed. A detailed description of a specific method for controlling a hybrid vehicle is given, for example, in U.S. Pat. No. 6,131,680, the disclosure of which is hereby incorporated by reference for all purposes..

The present working example thus entails adopting a procedure in which variations in the accelerator opening AOP are set depending on whether the normal sensor output AP2 falls within the opening region R2*a*, holding region R2*b*, or closing region R2*c*, so the variations in accelerator opening can be smoothed somewhat in comparison with a case in which the two sensors operate normally. As a result, the vehicle can travel continuously and in a somewhat slower response to the driver's pedal operation.

E2. Second Working Example of Vehicle Control During Accelerator sensor Malfunction In the second working example, the accelerator opening is set with consideration for the following conditions in addition to the conditions for setting the accelerator opening shown in FIG. 12.

Figure 14A:
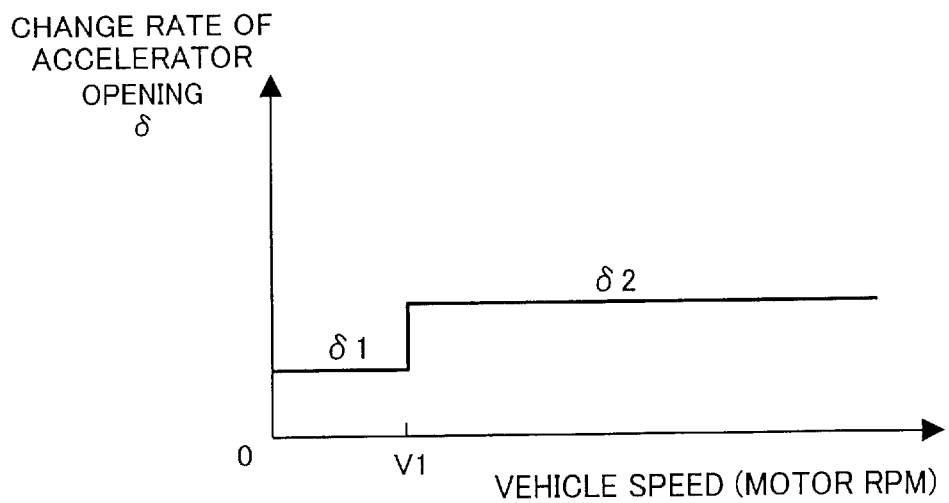
FIGS. 14(A) and 14(B) show an example in which the rate of change of the accelerator opening is set in accordance with speed.

The rate of change (increase or decrease) of the accelerator opening is first determined depending on the vehicle speed. FIG. 14(A) shows an example in which the rate of change of the accelerator opening is set in accordance with the vehicle speed. Here, the rate of change is set to a relatively low level $\delta_1$ when the vehicle speed falls within the range 0 to V1, and to a comparatively high level $\delta_2$ when the vehicle speed is greater than V1.

Figure 14B:
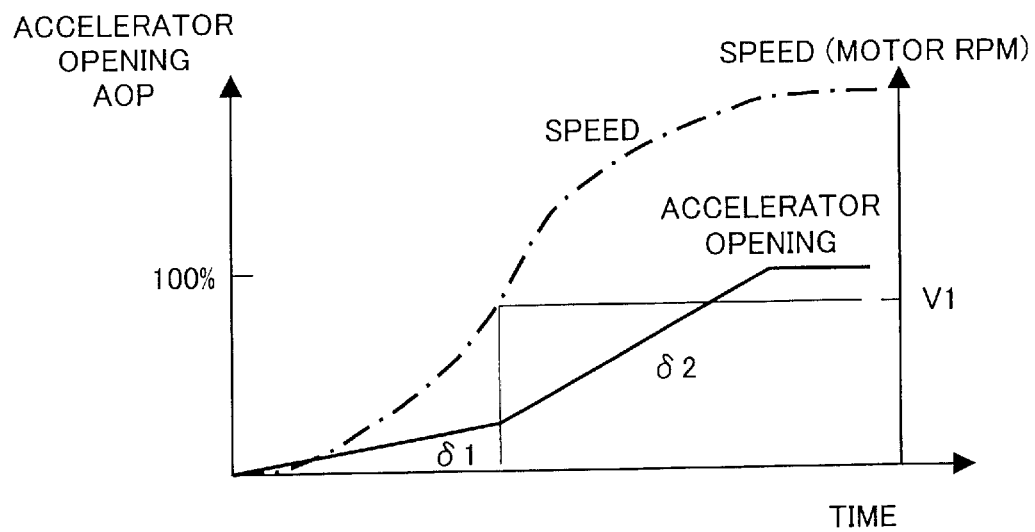

FIG. 14(B) shows an example of changes in vehicle speed and accelerator opening obtained by setting the rate of change in this manner. The solid-line and chain-line graphs show changes in the accelerator opening and vehicle speed, respectively. It can be seen in the drawing that the accelerator opening increases rectilinearly at the lower change rate $\delta_1$ until the speed reaches V1, and continues to increase rectilinearly at the higher change rate $\delta_2$ thereafter. This arrangement entails setting the change rate in a manner such that the change rate of the accelerator opening increases with increased speed, making a vehicle more maneuverable when one of the accelerator sensors has developed a fault.

In the example shown in FIGS. 14(A) and 14(B), the same absolute values were adopted for the change rate (rate of increase) in the opening region R2*a* and the change rate (rate of decrease) in the closing region R2*c*. It is, however, possible to select different values for the rates at which the accelerator opening decreases and increases.

It should be noted that the accelerator opening is desired to rapidly increase when the vehicle starts from standstill on a sloping road upward. Specifically, there is a possibility that when a small accelerator opening is set during start from standstill on a sloping road, the torque will be insufficient and the vehicle will roll back because the torque command value Tr (FIG. 13) will be low accordingly. In view of this, the second working example provides an improvement whereby the accelerator opening is allowed to increase in a substantially stepwise manner when the vehicle acceleration established based on the travel mode of the vehicle is opposite in sign to the actual acceleration of the vehicle, as described below.

Figure 15A:
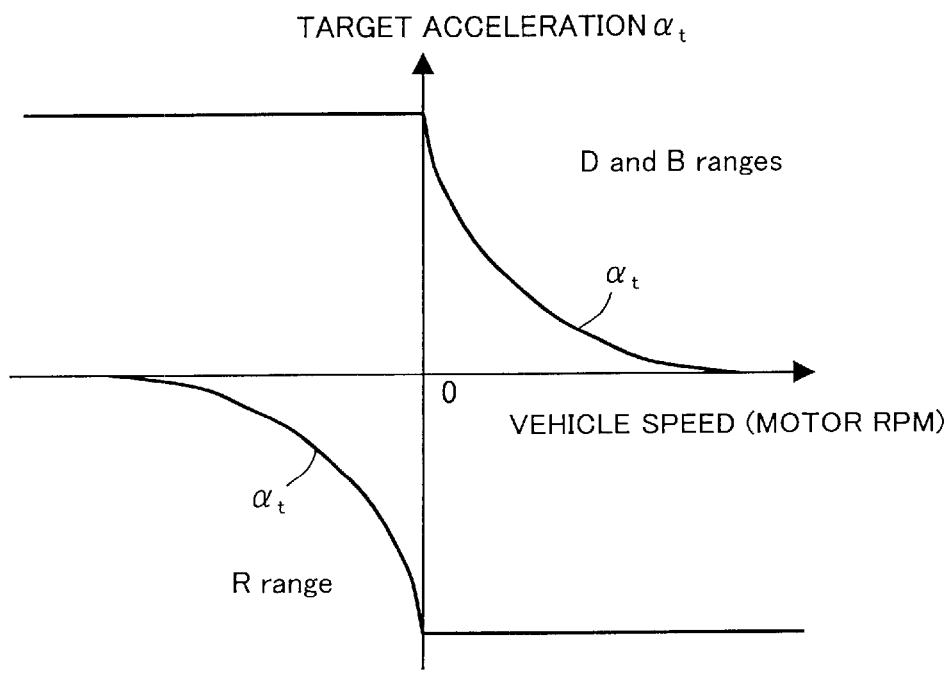
FIGS. 15(A) and 15(B) show the offset value FF of the accelerator opening applied when the current acceleration $\alpha_c$ and the target acceleration $\alpha_t$ have mutually opposite signs.
Figure 15B:
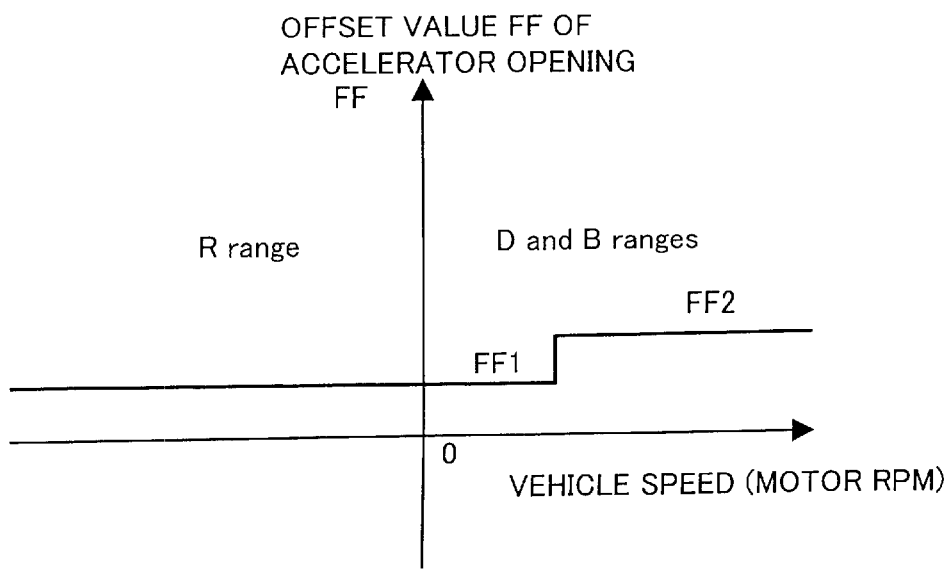

FIG. 15(A) shows an example of a target acceleration $\alpha_t$ that depends on the vehicle speed, and FIG. 15(B) shows an offset value FF of the accelerator opening applied when the current acceleration $\alpha_c$ and the target acceleration $\alpha_t$ have mutually opposite signs. In the hybrid vehicle of the present working example, two ranges (D and B) are used for the advance mode. The B range corresponds to a mode in which engine braking is easier to accomplish than in the D range.

The target acceleration $\alpha_t$ is positive in the D and B ranges and negative in the R range. The offset value FF shown in FIG. 15(B) is added to the accelerator opening AOP in a substantially stepwise manner when the current acceleration of the vehicle is opposite in sign to the target acceleration thereof. For example, the offset value FF1 at zero speed is added to the accelerator opening when the D or B range is selected for start from standstill and the current acceleration $\alpha_c$ of the vehicle is negative in sign (when the vehicle starts rolling back). The same applies to a case in which the R range is selected for start from standstill and the current acceleration $\alpha_c$ of the vehicle is positive in sign. As a result, it is possible to make it more likely that a vehicle will be prevented from moving in the opposite direction from the intended travel mode due to the lack of torque on a steeply sloping road.

The rate of change (that is, angular acceleration) of the rotation angle sensor (rpm sensor) 144 of the second motor MG2 is preferably adopted as the vehicle acceleration $\alpha$ to determine whether the offset value FF of the accelerator opening AOP should be added. The reason is that the rotation angle sensor (so-called resolver or the like) for a motor is more sensitive than an rpm sensor used on an axle, and can therefore increase the accelerator opening at a higher pace in accordance with the actual acceleration, making it possible to improve the response in increasing torques. This effect is particularly pronounced in hybrid vehicles in which a motor is used as the prime mover for driving the axle because this motor can be used to achieve an instantaneous torque increase.

Other operating states sometimes allow the same effects to be obtained by adding the offset value FF to the accelerator opening AOP. The above arrangement is advantageous in that closely spaced acceleration cycles can be easily performed by adding the offset value FF when, for example, a driver temporarily slows down a moving vehicle by stepping on the brake, and steps on the accelerator pedal immediately thereafter. Specifically, the present working example entails setting the accelerator opening AOP to zero when the driver steps on the brake pedal, as described with reference to the first working example. Consequently, the accelerator opening AOP is set to zero when the brake pedal is stepped on while the vehicle is moving. In cases in which the offset value FF shown in FIG. 15(B) is not added to the accelerator opening AOP, the accelerator opening AOP continues to gradually increase and repeated acceleration is difficult to accomplish when the accelerator pedal is again depressed all the way to the opening region R2*a* (FIG. 12). Consequently, the vehicle continues to slow down for some time, and a negative acceleration is maintained. By contrast, the present working example entails adding the offset value FF to the accelerator opening AOP when the accelerator pedal is depressed all the way to the opening region R2a (FIG. 12) and it is detected that the target acceleration $\alpha_t$ and current acceleration $\alpha_c$ of the vehicle are mutually opposite in sign. As a result, vehicle acceleration can be immediately repeated. Such repeated post-brake acceleration can also be performed during cornering or when vehicles follow each other at a prescribed distance.

The offset value FF of the accelerator opening thus set may preferably increase with increased vehicle speed, as shown in FIG. 15(B). This arrangement allows re-acceleration with greater smoothness after the brake is stepped while as the vehicle is moving at a high speed.

The need to add the offset value FF of the accelerator opening AOP is preferably determined with a prescribed periodicity. The control input setting section 272b determines, for example, the need for adding the offset value FF every 100 ms. This would make it possible to prevent the accelerator opening AOP from increasing excessively rapidly.

Alternatively, the accelerator opening AOP may be increased multiple times by the offset value FF in brief time intervals (for example, 50 ms). In other words, the accelerator opening AOP may be increased at least once in a stepwise manner when it is concluded that the offset value FF is to be added to the accelerator opening AOP. Other conditions can also be set as practical conditions for adding the offset value FF.

FIG. 16 shows the manner in which the accelerator opening AOP varies in the second working example. In the second working example, the accelerator opening AOP is set with consideration for the following four conditions.

(1) Dividing the active regions R2a, R2b, and R2c (FIG. 12)

(2) Clearing the accelerator opening during breaking (3) Setting the change rate δ of the accelerator opening according to vehicle speed (FIG. 14(A))

(4) Adding the offset value FF when the current acceleration $\alpha_c$ is opposite in sign to an anticipated acceleration for a travel mode (FIGS. 15(A) and 15(B))

When the first accelerator sensor develops a fault at time $t_{20}$ in FIG. 16, only the output AP2 of the normal second accelerator sensor is used thereafter. During period $t_{20}$–$t_{21}$, the accelerator opening AOP is kept constant because the output AP2 of the second accelerator sensor falls within the holding region R2b. During the subsequent period $t_{21}$–$t_{22}$, the accelerator opening AOP decreases because the sensor output AP2 falls within the closing region R2c. At time $t_{22}$, the driver steps on the brake pedal, and the accelerator opening AOP is cleared to zero as a result. When the driver again steps on the accelerator pedal and the sensor output AP2 reaches the opening region R2a at time $t_{23}$, the accelerator opening AOP increases by the offset value FF1 or FF2 (FIG. 15(B)) because it is concluded that the current acceleration $\alpha_c$ (negative) is opposite in sign to the target acceleration $\alpha_t$ (positive). During period $t_{23}$–$t_{24}$, the accelerator opening AOP increases at the low rate $\delta_1$. At time $t_{24}$, the accelerator opening AOP increases at the high rate $\delta_2$ after the speed has reached V1 (FIG. 14(A)).

Thus, the second working example entails setting the accelerator opening in accordance with the four setting conditions (1) to (4) described above, making it possible to vary the accelerator opening more gently than when the two accelerator sensors operate normally, and allowing the desired torque to be generated in accordance with the operating conditions.

The second working example can also be implemented by adopting solely the setting conditions (3) and (4) and dispensing with other conditions. Using all four setting conditions is preferred because of improved vehicle maneuverability.

E3. Third Working Example of Vehicle Control During Accelerator sensor Malfunction In the third working example, the four setting conditions of the second working example are supplemented by the condition that the offset of the accelerator opening be added even when the current acceleration $\alpha_c$ of the vehicle fails to reach a minimum acceleration $\alpha_{min}$.

Figure 17A:
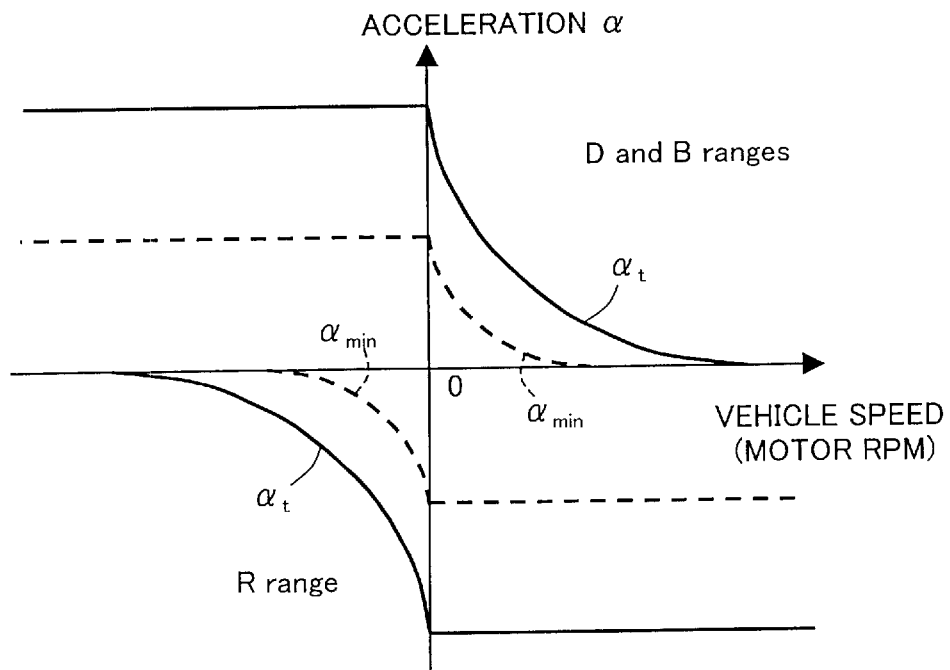
FIGS. 17(A) and 17(B) show the offset value FF of the accelerator opening applied when the current acceleration $\alpha_c$ fails to achieve the minimum acceleration $\alpha_{mm}$ in a third working example.
Figure 17B:
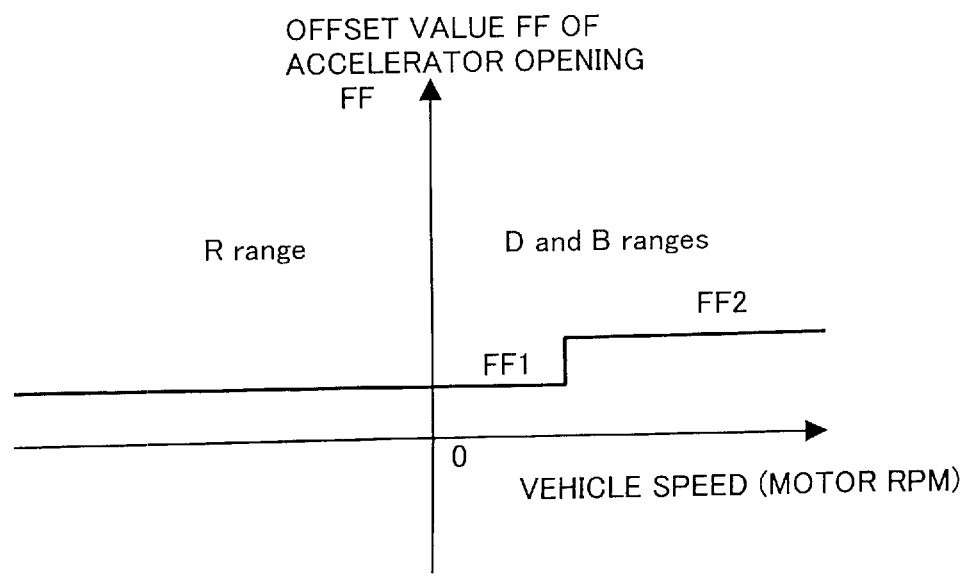

FIG. 17(A) shows the minimum acceleration $\alpha_{min}$ used in the third working example. The minimum acceleration $\alpha_{min}$ is set as a prescribed value less than the target acceleration $\alpha_t$. The offset value FF shown in FIG. 17(B) is added to the accelerator opening AOP in the substantially stepwise manner when the accelerator pedal is depressed all the way to the opening region R2a but the current acceleration $\alpha_c$ of the vehicle still fails to reach the minimum acceleration $\alpha_{min}$. The vehicle can thus be accelerated more smoothly.

In the third working example, it is possible to dispense with the use of the setting condition (4) described with reference to the second working example. Specifically, it is possible to establish the need for adding the offset value FF solely in accordance with whether the current acceleration $\alpha_c$ has reached the minimum acceleration $\alpha_{min}$, without determining whether the current acceleration $\alpha_c$ and the anticipated acceleration for a travel mode are mutually opposite in sign. However, using the setting condition (4) described with reference to the second working example is beneficial for facilitating repeated acceleration, particularly when the vehicle travels at a high speed.

A value obtained by subtracting a given value from the target acceleration $\alpha_t$ can be used as minimum acceleration $\alpha_{min}$ instead of the minimum acceleration $\alpha_{min}$ shown in FIG. 17(A).

Figure 18:
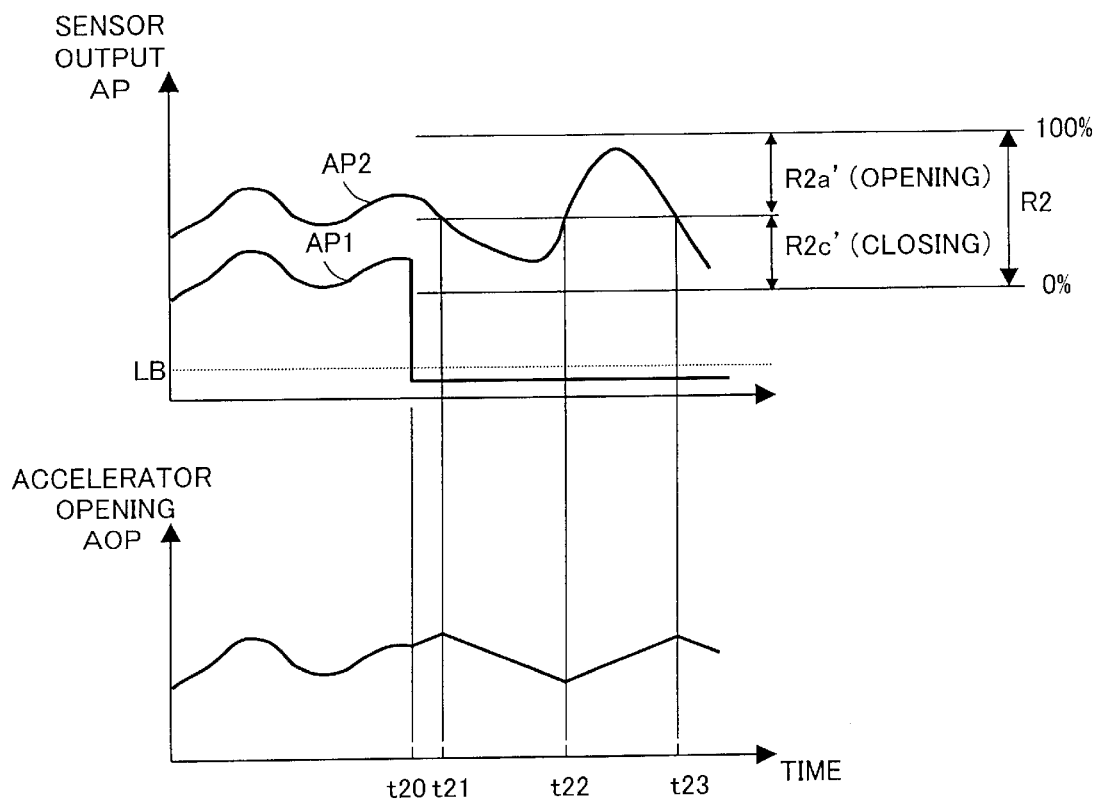
FIG. 18 shows the sectors into which the output ranges of accelerator sensors are divided in accordance with a fourth working example.

E4. Fourth Working Example of Vehicle Control During Accelerator sensor Malfunction FIG. 18 shows the sectors into which the output ranges of accelerator sensors are divided in accordance with a fourth working example. In this working example, the output range R2 of a normal accelerator sensor is divided into two regions (opening region R2a' and closing region R2c'), without any holding region being present. Variations of the accelerator opening can thus be somewhat smoothed in comparison with the normal operation of both sensors, so the vehicle can travel continuously and in a somewhat slower response to the driver's pedal operation. However, setting up a holding region R2b as shown in FIG. 12 is beneficial in the sense that vehicle operation is facilitated because its speed can easily be kept constant.

The sectors used in the examples of FIGS. 12–18 may also be configured such that the opening regions R2a and R2a' are further divided into a plurality of small domains. In this case, the change rate of each domain is set to a different level. Similarly, the closing regions R2c and R2c' may further be divided into a plurality of small domains. This arrangement improves maneuverability because variations in the accelerator opening AOP can be adjusted more finely.

F. Fault Detection for Shift Position Sensors

Figure 19:
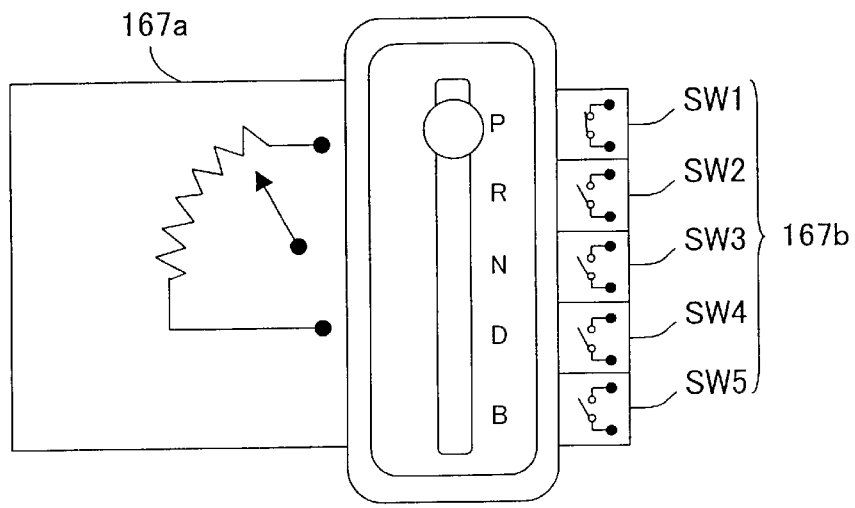
FIG. 19 shows a structure having two types of shift position sensors.

FIG. 19 shows a structure of two types of shift position sensors 167a and 167b. The first shift position sensor 167a is an analog sensor (for example, a potentiometer) in which the output signal SP1 varies continuously with the movement of the shift lever. The second shift position sensor 167b is a switch-type sensor composed of a plurality of position switches SW1–SW6 disposed in a plurality of positions.

Figure 20:
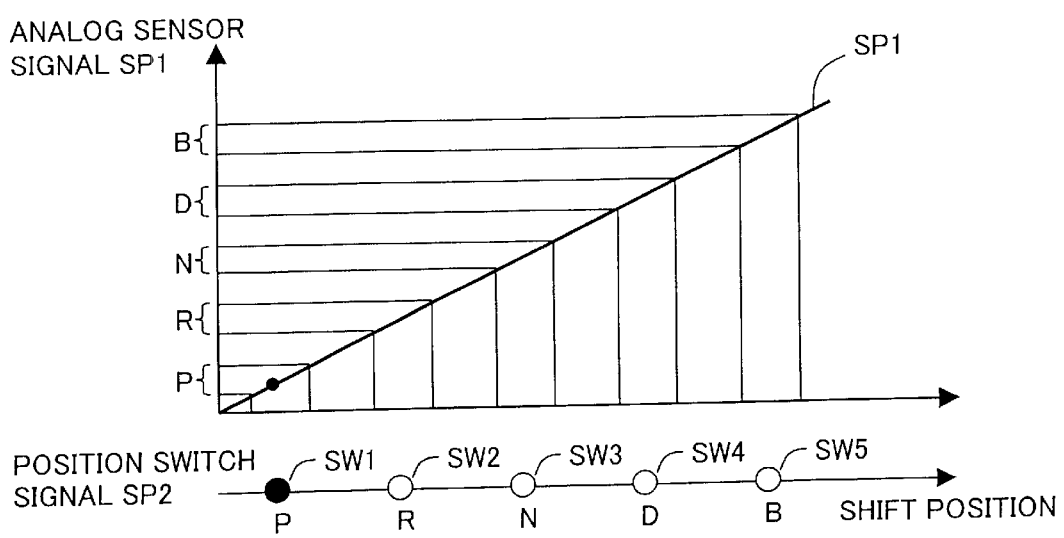
FIG. 20 is a diagram showing the input/output characteristics of the shift position sensor.

FIG. 20 shows the input/output characteristics of the two shift position sensors 167a and 167b. Five shift positions of P, R, N, D, and B ranges are available in the hybrid vehicle of the present embodiment. As used herein, the term "B range" refers to a travel mode in which engine braking is easier to accomplish than in the D(Drive) range.

With the analog sensor signal SP1, an effective range of signal levels for each shift position is defined in advance, as can be seen by viewing the vertical axis of the graph. In the example shown, the value (shown by a black circle) of the analog sensor signal SP1 is placed inside the effective P range. The position switch signal SP2 indicates that only the first switch SW1 for the P range is closed (shown by a black circle). Thus, the two sensors 167*a* and 167*b* constituting the shift position sensor 167 produce redundant control inputs (shift positions) when both these sensors operate normally.

The shift position sensor 167 is similar to the accelerator sensor 165 (FIG. 3) in that the master control CPU 272 has the functions of a fault detector 272*a* and a control input setting section 272*b*.

Figure 21:
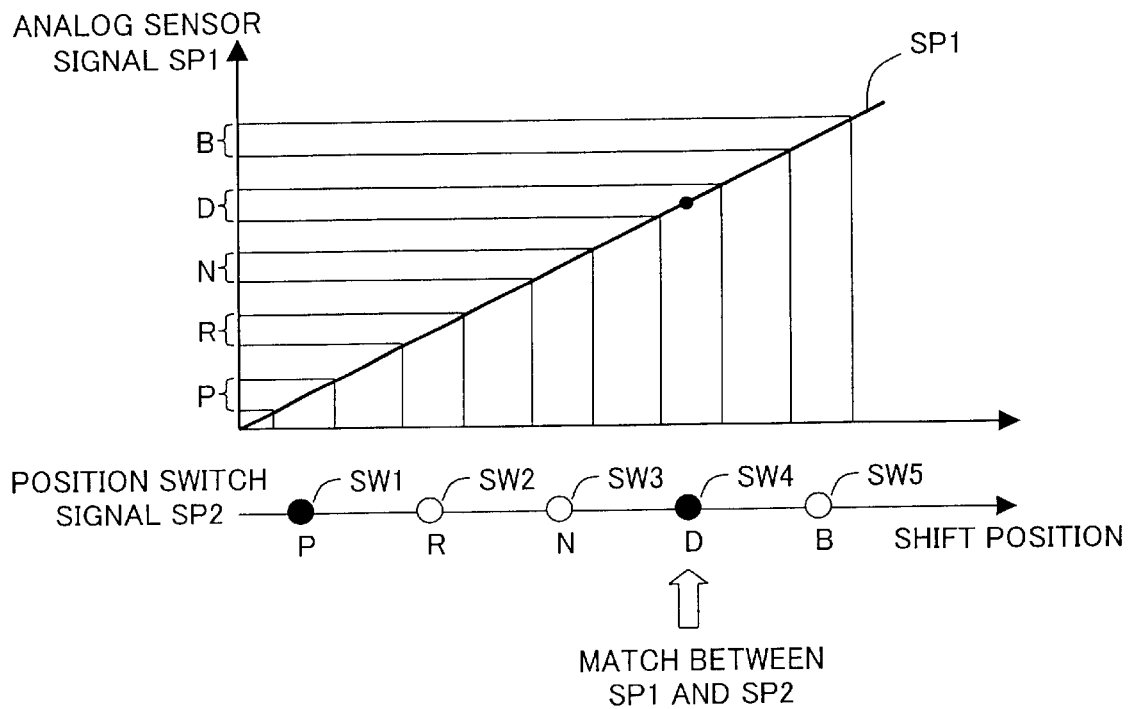
FIG. 21 shows fault event No. 1 in a shift position sensor.

FIG. 21 illustrates a case in which a fault event No. 1 (Faulty Closure Of Switch-type Sensor 167*b*) occurs in a shift position sensor. In this example, the actual shift lever is in the D range, and the analog sensor signal SP1 correctly indicates the D range, but the position switch signal SP2 closes the switches SW1 and SW4 indicating the P and D ranges. Thus, the present working example is configured such that even when a switch-type sensor develops a closure fault, if the same position (D range) is indicated by the two signals SP1 and SP2, that position is used as the correct position. Consequently, the control routine can be continued using the normal sensor when the other sensor has developed a fault.

Figure 22A:
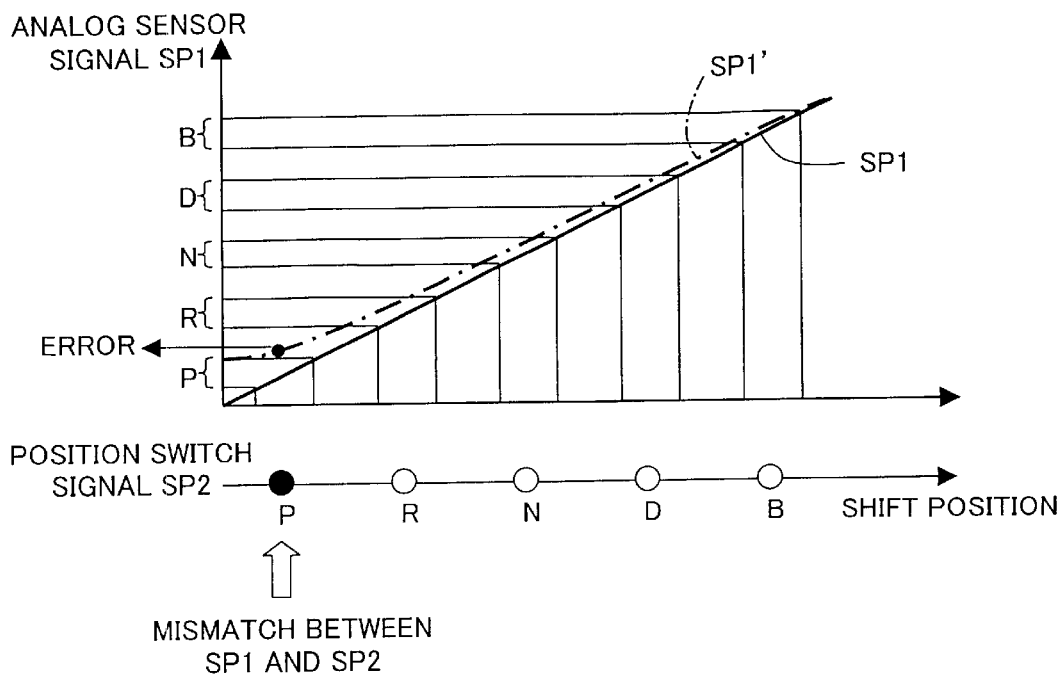
FIGS. 22(A) and 22(B) shows fault event No. 2 in a shift position sensor.

FIG. 22(A) shows a case in which the shift position sensor 167 develops a fault event No. 2 (Shift Of Analog Sensor Output). In this example, the characteristics of the actual accelerator sensor output signal SP1' are shifted upward relative to the characteristics of the correct signal SP1. In particular, the shift is considerable near the P range and decreases toward the B range, which is on the opposite side from the P range.

In the example shown in FIG. 22(A), the actual shift lever is in the P range, and the position switch signal SP2 correctly is in the P range, but the analog sensor signal SP1 is out of the effective P range. In this case, the two signals SP1 and SP2 fail to indicate the same position, prompting a conclusion that the P range may possibly be incorrectly indicated by the position switch signal SP2. A decision is therefore made not to use the P range for vehicle control; that is, the P range is inoperable.

Figure 22B:
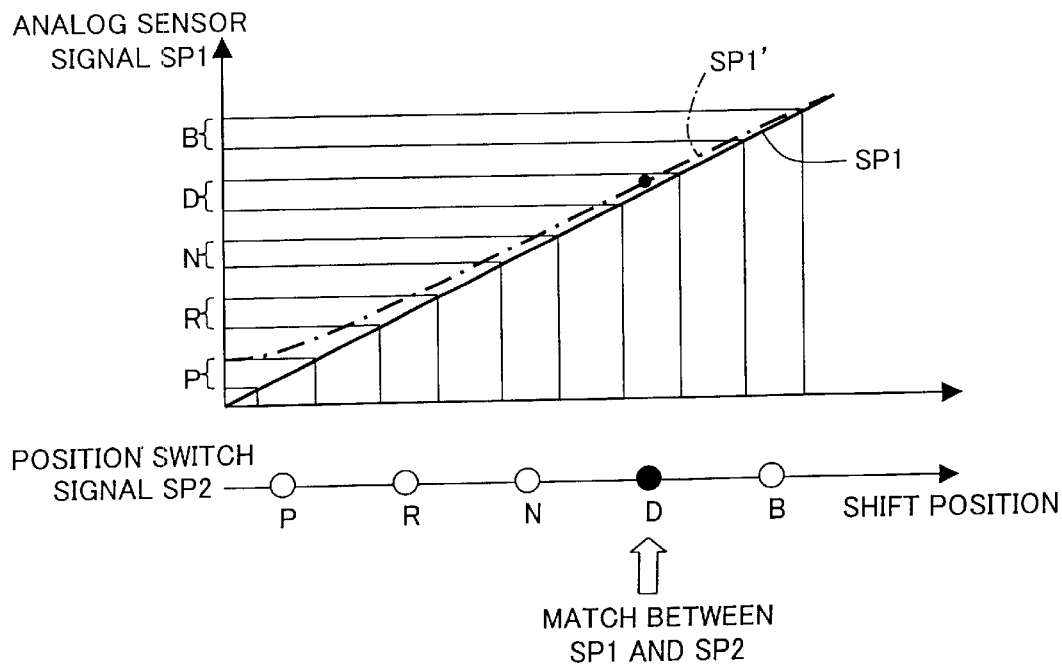

In the example shown in FIG. 22(B), the actual shift lever is in the D range. The position switch signal SP2 indicates the D range, as does the analog sensor signal SP1. Thus, the fact that the same position is indicated by the two signals SP1 and SP2 is used as a basis for concluding that this is the correct position even when the analog sensor signal SP1' is shifted. Consequently, the vehicle can be controlled using several positions even when one of the sensors develops a fault.

When the analog sensor signal SP1 develops an abnormal shift in the manner shown in FIG. 22(A) or 22(B), the P range cannot be utilized, but the probability is still high that other positions could be used. It is therefore possible to drive the vehicle to a repair facility after a shift position sensor has developed such a fault.

In common practice, a vehicle can be started up only when its shift position is in the P (Parking) range. With this type of ordinary control, an inconvenience is created when a fault develops in the P range in the manner shown in FIGS. 22(A) and 22(B) because of the inability of the vehicle to make a startup. In preferred practice, therefore, the master control CPU 272 allows the vehicle to be started up in the N (Neutral) range when a fault develops in the P range but the N range remains normal.

When a fault develops in one of the two shift position sensors 167*a* and 167*b*, it is preferable to allow the shift position change from the N range to the D range only when the driver steps on the brake. If the driver moves the shift position sensor from the N range to the D range without stepping on the brake, the control input setting section 272*b* will then ignore the move and continue controlling the vehicle from within the N range. This will allow the intended change in shift position implemented by the driver to be reflected more accurately in the vehicle control routine if a shift position sensor develops a fault. In general, it is preferable to allow the shift position change from the N range to a torque-producing range (D, B, or R) only when the driver steps on the brake.

G. Modifications

G1. Modification 1

Although the above working examples were described with reference to a so-called mechanical-distribution hybrid motor vehicle in which a planetary gear was used to distribute the driving force of the engine between the axle and the first motor MG1, the present invention is also applicable to so-called electrical-distribution hybrid motor vehicles in which the planetary gear is dispensed with and the driving force of the engine is electrically distributed using a motor/generator. An electrical-distribution hybrid motor vehicle is disclosed in U.S. Pat. No. 5,804,934, the disclosure of which is hereby incorporated by reference for all purposes.

The present invention can be adapted to various moving bodies including vehicles other than hybrid vehicles, aircraft, and watercraft. In other words, the present invention can be adapted to any moving body that uses at least one prime mover. The present invention can be further adapted to controlling of objects other than moving bodies.

G2. Modification 2

Although the above embodiments are described with reference to cases in which two sensors are used to provide redundant control inputs, the present invention can be further adapted to cases in which three or more sensors are used in order to provide redundant control inputs. It should be noted, however, that using only two sensors usually makes it particularly difficult to determine which of them has developed a fault if the outputs of both sensors are within a normal range. Consequently, the present invention is particularly effective when only two sensors are used in order to provide redundant control inputs. The plurality of sensors may have the same or different input/output characteristics.

G3. Modification 3

A memory other than the EEPROM 282 may be disposed inside the fault history recording circuit 280 (FIG. 2). Using a nonvolatile memory such as EEPROM is preferred, however, because recorded data are not lost when power is cut off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for controlling a vehicle using first and second accelerator sensors configured to provide an accelerator control input, the control device comprising:

a fault detector configured to detect that one of the first and second accelerator sensors has developed a fault; and an accelerator control input setting section configured to determine the accelerator control input using an output of a normal sensor other than a faulty sensor when the faulty sensor has been detected by the fault detector, the accelerator control input setting section dividing a full range of output signal levels of the normal sensor into a plurality of regions including an opening region in which the accelerator control input increases at a first rate of change, and a closing region in which the accelerator control input decreases at a second rate of change, the accelerator control input setting section determining a change in the accelerator control input depending on which of the plurality of regions contains the output signal level of the normal sensor.

2. A control device as defined in claim 1, wherein the plurality of regions have a holding region disposed between the opening region and the closing region and designed to keep the accelerator control input constant.

3. A control device as defined in claim 1, wherein at least one of the opening region and the closing region is divided into a plurality of smaller regions whose rates of change are set to mutually different levels.

4. A control device as defined in claim 1, wherein the accelerator control input setting section varies the rate of change according to a vehicle speed in at least one of the opening region and the closing region.

5. A control device as defined in claim 4, wherein the accelerator control input setting section increases the rate of change with an increase in vehicle speed in at least one of the opening region and the closing region.

6. A control device as defined in claim 1, wherein the accelerator control input setting section sets the accelerator control input to zero when a brake pedal of the vehicle is stepped on.

7. A control device as defined in claim 1, wherein the accelerator control input setting section determines the change in the accelerator control input in accordance with an actual acceleration of the vehicle and with which of the plurality of regions the output signal level of the normal sensor falls within.

8. A control device as defined in claim 7, wherein the accelerator control input setting section increases the accelerator control input stepwise at least once when the output signal level of the normal sensor falls within the opening region and an anticipated vehicle acceleration for a travel mode of the vehicle is opposite in sign to an actual acceleration of the vehicle.

9. A control device as defined in claim 7, wherein the accelerator control input setting section increases the accelerator control input stepwise at least once when the output signal level of the normal sensor falls within the opening region and an actual acceleration of the vehicle is below a preset minimum acceleration established in accordance with the vehicle speed.

10. A control device as defined in claim 7, wherein the vehicle is provided with at least one electric motor with a rotational angle sensor as a prime mover for driving an axle; and the accelerator control input setting section determines the actual acceleration of the vehicle from an output of the rotation angle sensor of the electric motor.

11. A control device as defined in claim 1, wherein the fault detector detects the faulty sensor by analyzing variation patterns of outputs of the first and second accelerator sensors when the outputs of the first and second accelerator sensors remain within respective normal output ranges thereof.

12. A control device as defined in claim 11, wherein the fault detector detects the faulty sensor by determining whether the variation pattern outputted by each sensor corresponds to one of a plurality of preset fault patterns.

13. A control device as defined in claim 12, wherein the plurality of fault patterns include at least one pattern selected from:

i) stepped variations of sensor output, ii) oscillations of sensor output, iii) abnormal variation of difference in the outputs of the first and second sensors, and iv) abnormally fixed state of sensor output.

14. A control device as defined in claim 12, further comprising a fault history recorder configured to record a fault history that describes the detected fault pattern.

15. A control device as defined in claim 11, wherein when the accelerator control input is set using the normal sensor other than the faulty sensor, the accelerator control input setting section sets the accelerator control input on the basis of the output of the normal sensor such that the accelerator control input is below the level that will be obtained from the same sensor when both the first and second accelerator sensors are in a normal state.

16. A control device as defined in claim 11, wherein when the output of either the first or second accelerator sensor varies abruptly at a rate of change greater than a predetermined threshold value, the accelerator control input setting section sets the accelerator control input on the basis of the output of a sensor other than the sensor with the abruptly varying output in a provisional period between a moment the output undergoes the abrupt change and a later moment the fault detector determines that a fault has occurred.

17. A control device as defined in claim 11, wherein when the output of either the first or second sensor varies abruptly at a rate of change greater than a predetermined threshold value, the accelerator control input setting section adopts the lesser of the two accelerator control inputs obtained from the outputs of the first and second accelerator sensors in a provisional period between a moment the output undergoes the abrupt change and a later moment the fault detector determines that a fault has occurred.

18. A vehicle comprising:

a prime mover configured to drive an axle of the vehicle; and a control device configured to control the prime mover using first and second accelerator sensors for provide an accelerator control input as a control input, the control device including:

a fault detector configured detect that one of the first and second accelerator sensors has developed a fault; and an accelerator control input setting section configured to determine the accelerator control input using an output of a normal sensor other than a faulty sensor when the faulty sensor has been detected by the fault detector, the accelerator control input setting section dividing a full range of output signal levels of the normal sensor into a plurality of regions including an opening region in which the accelerator control input increases at a first rate of change, and a closing region in which the accelerator control input decreases at a second rate of change, the accelerator control input setting section determining a change in the accelerator control input depending on which of the plurality of regions contains the output signal level of the normal sensor.

19. A vehicle as defined in claim 18, wherein the plurality of regions have a holding region disposed between the opening region and the closing region and designed to keep the accelerator control input constant.

20. A vehicle as defined in claim 18, wherein at least one of the opening region and the closing region is divided into a plurality of smaller regions whose rates of change are set to mutually different levels.

21. A vehicle as defined in claim 18, wherein the accelerator control input setting section varies the rate of change according to a vehicle speed in at least one of the opening region and the closing region.

22. A vehicle as defined in claim 21, wherein the accelerator control input setting section increases the rate of change with an increase in vehicle speed in at least one of the opening region and the closing region.

23. A vehicle as defined in claim 18, wherein the accelerator control input setting section sets the accelerator control input to zero when a brake pedal of the vehicle is stepped on.

24. A vehicle as defined in claim 18, wherein the accelerator control input setting section determines the change in the accelerator control input in accordance with an actual acceleration of the vehicle and with which of the plurality of regions the output signal level of the normal sensor falls within.

25. A vehicle as defined in claim 24, wherein the accelerator control input setting section increases the accelerator control input stepwise at least once when the output signal level of the normal sensor falls within the opening region and an anticipated vehicle acceleration for a travel mode of the vehicle is opposite in sign to an actual acceleration of the vehicle.

26. A vehicle as defined in claim 24, wherein the accelerator control input setting section increases the accelerator control input stepwise at least once when the output signal level of the normal sensor falls within the opening region and an actual acceleration of the vehicle is below a preset minimum acceleration established in accordance with the vehicle speed.

27. A vehicle as defined in claim 24, wherein the prime mover includes at least one electric motor with a rotational angle sensor; and
the accelerator control input setting section determines the actual acceleration of the vehicle from an output of the rotation angle sensor of the electric motor.

28. A vehicle as defined in claim 18, wherein the fault detector detects the faulty sensor by analyzing variation patterns of outputs of the first and second accelerator sensors when the outputs of the first and second accelerator sensors remain within respective normal output ranges thereof.

29. A vehicle as defined in claim 28, wherein the fault detector detects the faulty sensor by determining whether the variation pattern outputted by each sensor corresponds to one of a plurality of preset fault patterns.

30. A vehicle as defined in claim 29, wherein the plurality of fault patterns include at least one pattern selected from:
i) stepped variations of sensor output,
ii) oscillations of sensor output,
iii) abnormal variation of difference in the outputs of the first and second sensors, and
iv) abnormally fixed state of sensor output.

31. A vehicle as defined in claim 29, wherein the control device further comprises a fault history recorder configured to record a fault history that describes the detected fault pattern.

32. A vehicle as defined in claim 28, wherein when the accelerator control input is set using the normal sensor other than the faulty sensor, the accelerator control input setting section sets the accelerator control input on the basis of the output of the normal sensor such that the accelerator control input is below the level that will be obtained from the same sensor when both the first and second accelerator sensors are in a normal state.

33. A vehicle as defined in claim 28, wherein when the output of either the first or second accelerator sensor varies abruptly at a rate of change greater than a predetermined threshold value, the accelerator control input setting section sets the accelerator control input on the basis of the output of a sensor other than the sensor with the abruptly varying output in a provisional period between a moment the output undergoes the abrupt change and a later moment the fault detector determines that a fault has occurred.

34. A vehicle as defined in claim 28, wherein when the output of either the first or second sensor varies abruptly at a rate of change greater than a predetermined threshold value, the accelerator control input setting section adopts the lesser of the two accelerator control inputs obtained from the outputs of the first and second accelerator sensors in a provisional period between a moment the output undergoes the abrupt change and a later moment the fault detector determines that a fault has occurred.

35. A control method for controlling a vehicle using first and second accelerator sensors configured to provide an accelerator control input as a control input, the control method comprising the steps of:
(a) detecting that one of the first and second accelerator sensors has developed a fault; and
(b) determine the accelerator control input using an output of a normal sensor other than a faulty sensor when the faulty sensor has been detected,
the step (b) including the steps of:
dividing a full range of output signal levels of the normal sensor into a plurality of regions including an opening region in which the accelerator control input increases at a first rate of change, and a closing region in which the accelerator control input decreases at a second rate of change, and
determining a change in the accelerator control input depending on which of the plurality of regions contains the output signal level of the normal sensor.

36. A control method as defined in claim 35, wherein the plurality of regions have a holding region disposed between the opening region and the closing region and designed to keep the accelerator control input constant.

37. A control method as defined in claim 35, wherein at least one of the opening region and the closing region is divided into a plurality of smaller regions whose rates of change are set to mutually different levels.

38. A control method as defined in claim 35, wherein the rate of change varies according to a vehicle speed in at least one of the opening region and the closing region.

39. A control method as defined in claim 38, wherein the rate of change increases with an increase in vehicle speed in at least one of the opening region and the closing region.

40. A control method as defined in claim 35, wherein the accelerator control input is set to zero when a brake pedal of the vehicle is stepped on.

41. A control method as defined in claim 35, wherein the change in the accelerator control input is determined in accordance with an actual acceleration of the vehicle and with which of the plurality of regions the output signal level of the normal sensor falls within.

42. A control method as defined in claim 41, wherein the accelerator control input increases stepwise at least once when the output signal level of the normal sensor falls within the opening region and an anticipated vehicle acceleration for a travel mode of the vehicle is opposite in sign to an actual acceleration of the vehicle.

43. A control method as defined in claim 41, wherein the accelerator control input increases stepwise at least once when the output signal level of the normal sensor falls within the opening region and an actual acceleration of the vehicle is below a preset minimum acceleration established in accordance with the vehicle speed.

44. A control method as defined in claim 41, wherein the vehicle is provided with at least one electric motor with a rotational angle sensor as a prime mover for driving an axle; and the actual acceleration of the vehicle is determined from an output of the rotation angle sensor of the electric motor.

45. A control method as defined in claim 35, wherein the faulty sensor is detected by analyzing variation patterns of outputs of the first and second accelerator sensors when the outputs of the first and second accelerator sensors remain within respective normal output ranges thereof.

46. A control method as defined in claim 45, wherein when the accelerator control input is set using the normal sensor other than the faulty sensor, the accelerator control input is set on the basis of the output of the normal sensor such that the accelerator control input is below the level that will be obtained from the same sensor when both the first and second accelerator sensors are in a normal state.

47. A control method as defined in claim 45, wherein when the output of either the first or second accelerator sensor varies abruptly at a rate of change greater than a predetermined threshold value, the accelerator control input is set on the basis of the output of a sensor other than the sensor with the abruptly varying output in a provisional period between a moment the output undergoes the abrupt change and a later moment the fault detector determines that a fault has occurred.

48. A control method as defined in claim 45, wherein when the output of either the first or second sensor varies abruptly at a rate of change greater than a predetermined threshold value, the lesser of the two accelerator control inputs obtained from the outputs of the first and second accelerator sensors is adopted in a provisional period between a moment the output undergoes the abrupt change and a later moment the fault detector determines that a fault has occurred.

49. A control method as defined in claim 45, wherein the faulty sensor is detected by determining whether the variation pattern outputted by each sensor corresponds to one of a plurality of preset fault patterns.

50. A control method as defined in claim 49, wherein the plurality of fault patterns include at least one pattern selected from:

i) stepped variations of sensor output, ii) oscillations of sensor output, iii) abnormal variation of difference in the outputs of the first and second sensors, and iv) abnormally fixed state of sensor output.

51. A control method as defined in claim 49, further comprising the step of recording a fault history that describes the detected fault pattern in a non-volatile memory.

* * * * *